US010462428B1

(12) United States Patent
Grabow

(10) Patent No.: US 10,462,428 B1
(45) Date of Patent: Oct. 29, 2019

(54) VIDEO SYSTEM AND METHOD FOR ALLOWING USERS, INCLUDING MEDICAL PROFESSIONALS, TO CAPTURE VIDEO OF RELEVANT ACTIVITIES AND PROCEDURES

(71) Applicant: Ryan Grabow, Henderson, NV (US)

(72) Inventor: Ryan Grabow, Henderson, NV (US)

( * ) Notice: Subject to any disclaimer, the term of this patent is extended or adjusted under 35 U.S.C. 154(b) by 0 days.

(21) Appl. No.: 15/422,311

(22) Filed: Feb. 1, 2017

Related U.S. Application Data

(60) Provisional application No. 62/289,764, filed on Feb. 1, 2016.

(51) Int. Cl.
*H04N 7/18* (2006.01)
*H04N 5/225* (2006.01)
*H04N 5/232* (2006.01)
*H04N 5/77* (2006.01)

(52) U.S. Cl.
CPC .......... *H04N 7/185* (2013.01); *H04N 5/2252* (2013.01); *H04N 5/23241* (2013.01); *H04N 5/77* (2013.01)

(58) Field of Classification Search
CPC ...................................................... H04N 7/185
See application file for complete search history.

(56) References Cited

U.S. PATENT DOCUMENTS

| 2008/0170838 A1* | 7/2008 | Teetzel | A42B 3/042 |
| | | | 386/358 |
| 2008/0204589 A1* | 8/2008 | Chang | A61B 90/35 |
| | | | 348/373 |

* cited by examiner

*Primary Examiner* — Girumsew Wendmagegn
(74) *Attorney, Agent, or Firm* — FisherBroyles, LLP; Rob L. Phillips

(57) ABSTRACT

A system includes a portable video camera; a head-worn apparatus; a mount for attaching the portable video camera to the head-worn apparatus, centering the lens of said action camera in the center of the wearer's field of vision; the mount permitting the portable video camera to rotate at least upward and downward; an attachable component to stop audio recording of said camera; a remote battery for powering the portable video camera; a remote video recorder connected wirelessly to the video camera via video transmitter and receiver pair; a remote monitor connected to the portable video camera wirelessly or via wire, and said remote monitor configured to output a live image being captured by the portable video camera. The head-worn apparatus may be a surgical head mount, arthroplasty helmet, surgical light headgear, hood, etc.

10 Claims, 22 Drawing Sheets

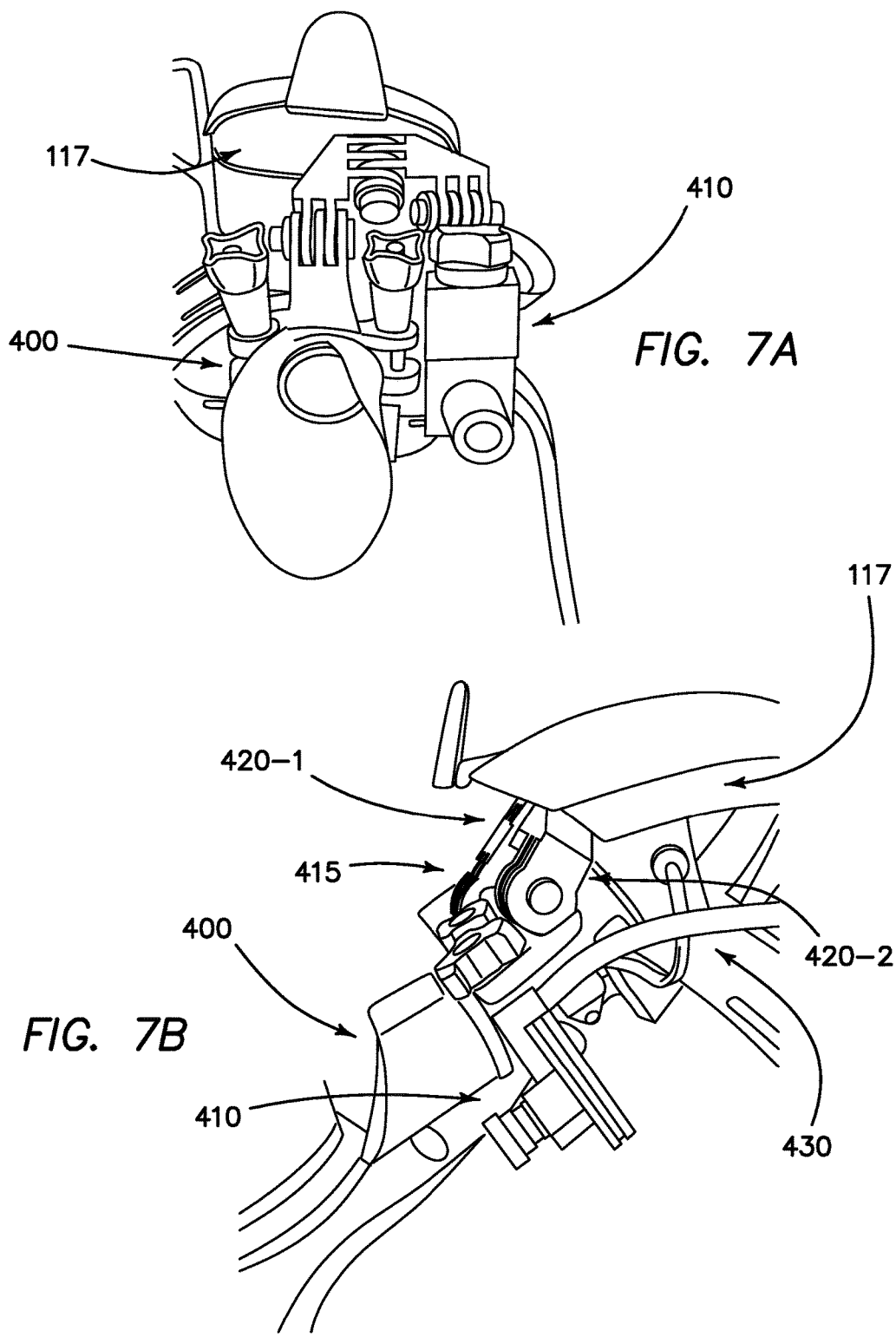

VIDEO SYSTEM AND METHOD FOR ALLOWING USERS, INCLUDING MEDICAL PROFESSIONALS, TO CAPTURE VIDEO OF RELEVANT ACTIVITIES AND PROCEDURES

CROSS-REFERENCE

This application claims priority to U.S. Patent Application No. 62/289,764 filed Feb. 1, 2016 and incorporated herein for any and all purposes.

FIELD OF THE INVENTION

The embodiments of the present invention relate to a head-mounted video system allowing surgeons, or other users, to capture, share, and/or transmit live video of medical or surgical procedures or other activities from a surgeon's or wearers point-of-view.

BACKGROUND

Video systems that capture and/or share live view video have multiple benefits, such as: (i) capture a "How-to" video; (ii) provide "live view" of a procedure or activity to enable those present to "see" from the instructor's perspective, (iii) document that the required steps in a procedure were completed; (iv) allow viewers of "live" video to comment on the technique. This type of video system benefits individuals with multiple activities or trades, arts and crafts projects, fly tying, wood workers, plumbers, cabinet makers and the like. Healthcare workers, such as nurses, physical therapists, physicians and surgeons are ideally situated to benefit from this type of video system.

Videos depicting medical and surgical procedures have many uses including patient, staff and/or student education. For example, a video showing a surgical procedure can educate a medical student or resident in the "how-to" of a procedure and also help educate a patient regarding the upcoming procedure. The use of video to educate physicians-in-training is a powerful tool to allow repeated viewing of the procedure from the surgeon's perspective, both in the operating room or away from the operating room or clinic. However, capturing video of medical and surgical procedures from the physician's point-of-view, especially surgeries, is challenging. Cameras mounted in lights or aimed over a surgeon's shoulder cannot be positioned to capture the exact surgeon's viewing angle or are blocked by the surgeon's head during critical portions of the procedure. The operative wound may be deep and prevent a camera from focusing on the desired anatomy. Professional camera crews may help but are typically cost prohibitive. Current head-worn cameras for healthcare are tethered to a computer limiting a surgeon's mobility. Additionally, they provide less than optimal video and are outdated by today's video standards.

Current sports or "action" cameras presently offer many possibilities to capture point-of-view video, but are unfortunately limited in many ways. There is presently no way to securely mount an action camera to the wearer's head to place the lens at eye level to capture true point-of-view video. They are limited in battery power, recording length, ability to magnify and are unable to provide a true live image for observers to view. Additionally, batteries and memory cards cannot be changed easily without stopping the task or surgical procedure being recorded.

It would be advantageous to develop a head-mounted video system configured to capture video from the wearer's point-of-view that not only enables the recording of an activity or surgical procedure, but also provides a "live view" of the camera output, wirelessly to an external monitor or recorder to allow spectators to "see" what the wearer is "seeing" for healthcare, surgery and other activities. Additionally, it would be advantageous for the system to provide an extended length of operation allowing the wearer to record and/or transmit video continuously over the course of a normal work day (>8.5 hours) enabling the wearer to use the system for a full day, without stopping to change batteries or memory cards. Additionally, it would be advantageous to provide a means for the wearer to "see" and monitor the live output of the camera to ensure that the lens is pointed at the desired subject. Additionally, it would be advantageous to provide a video system adaptable to allow the user to attach the system to other types of head-worn equipment.

SUMMARY

Accordingly, a video system based on the embodiments of the present invention may utilize standard and modified sports/action cameras; head-worn apparatuses; mounts for attaching action cameras to said head-worn apparatuses, said mounts permitting said action camera to rotate at least upward and downward; means to prevent audio recording of said action camera as desired; means to provide remote battery power to said action camera; a remote battery for powering said action camera for extended use; means for preventing audio recording from action cameras; video out wire to connect said action camera live video output to wireless video transmitter; a wireless video transmitter and receiver to transmit and receive live video output of said action camera; a remote video recorder connected to said wireless video receiver; a portable monitor; a wearable high definition (HD) monitor to show live camera output to wearer; signal splitter to send live camera output to wearable HD monitor and wireless video transmitter; and waist pack to hold remote battery, splitter, and video transmitter around wearer's waist.

Depending on the embodiment, the head-worn apparatus may be head gear, a headband or headgear for surgical headlights or loupes, surgical head gear, total joint arthroplasty helmet and/or hood isolation hood or hard hat. Additional, mounting arms may also be attached to said head-worn mount for multiple configurations. Specific head gear mounting options will become evident from the following detailed descriptions, drawings, and claims.

Other variations, embodiments and features of the present invention will become evident from the following detailed description, drawings and claims.

BRIEF DESCRIPTION OF THE DRAWINGS

FIGS. 2A through 2E illustrate various views of an action camera attached to a novel and customized head gear apparatus with articulating band, camera housing attachment, camera screw-on attachment, and power and video external cables, according to the embodiments of the present invention;

FIGS. 2F through 2J illustrate various views of an attachment mount fixed to an articulating band on the novel head gear apparatus according to the embodiments of the present invention;

FIG. 2K illustrates an action camera frame according to the embodiments of the present invention;

FIGS. 2L through 2Q illustrate various views of articulating arms and 90 degree arms that connect the camera to the fixed mount or headband clip on the articulating band, or head bands of various head mount apparatus including total joint arthroplasty hoods, surgical headlights, contamination hoods/helmets, hard hats and the like according to the embodiments of the present invention;

FIGS. 3H through 3L illustrate various views of the custom headband clip for attachment of a video camera to any head worn apparatus with a head band, such as an arthroplasty helmet/hood, surgical light head gear, hard hat, or other surgical or nonsurgical head mount apparatus according to the embodiments of the present invention;

FIGS. 3M through 3O illustrate a custom action camera with lens separated from the camera connected to a total joint helmet and to a headlight system with the custom headband clip for the camera attachment and a custom post clamp to attach the separated lens body.

FIG. 7 illustrates a flow chart of one methodology of using the system according to the embodiments of the present invention;

DETAILED DESCRIPTION

Figure 1A:
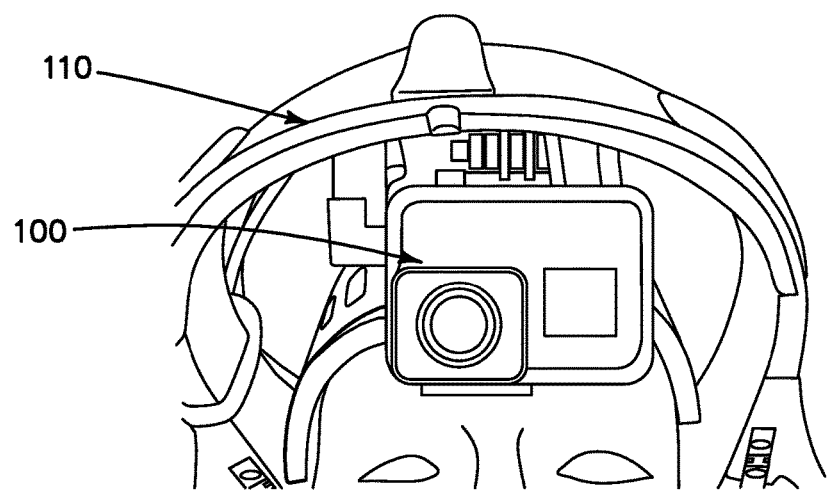
FIG. 1 illustrates a block diagram of a system according to the embodiments of the present invention.
Figure 1B:
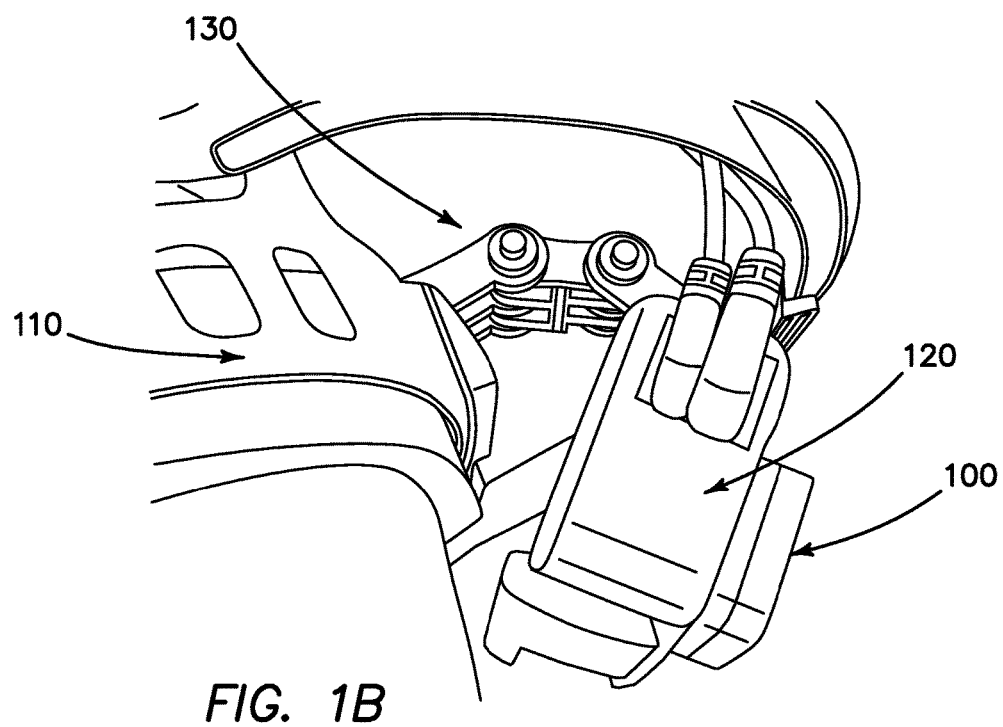
Figure 1C:
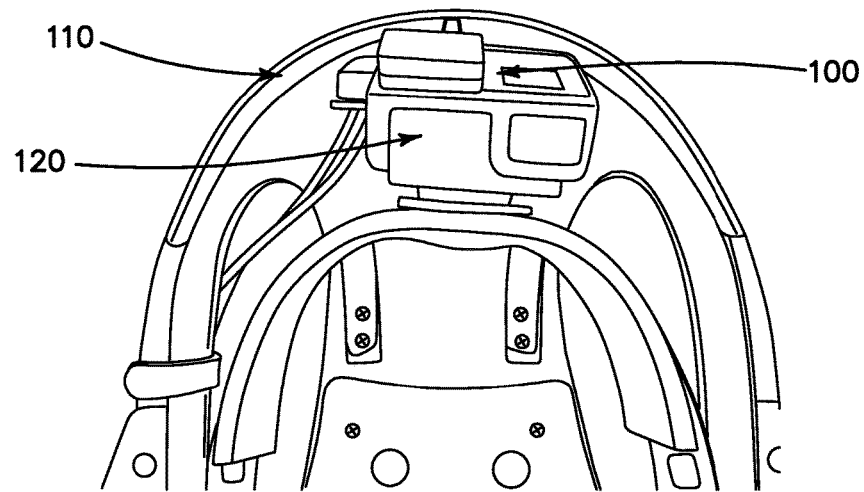
Figure 1D:
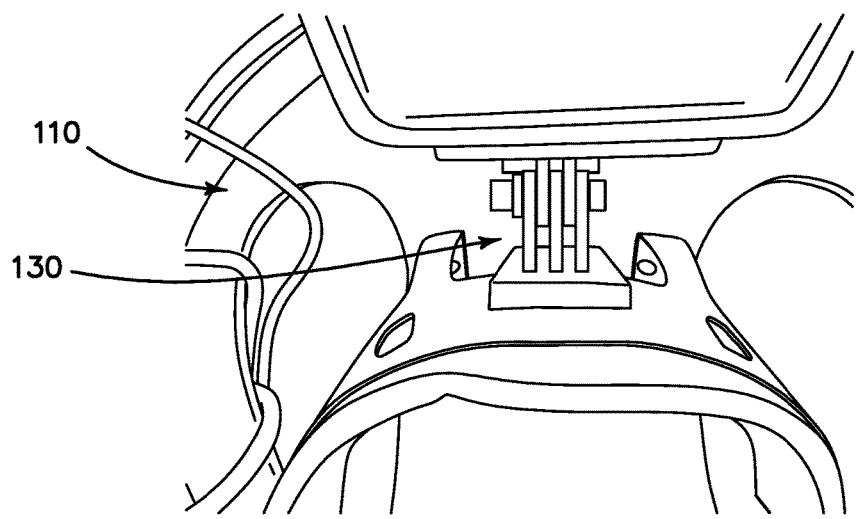
Figure 1E:
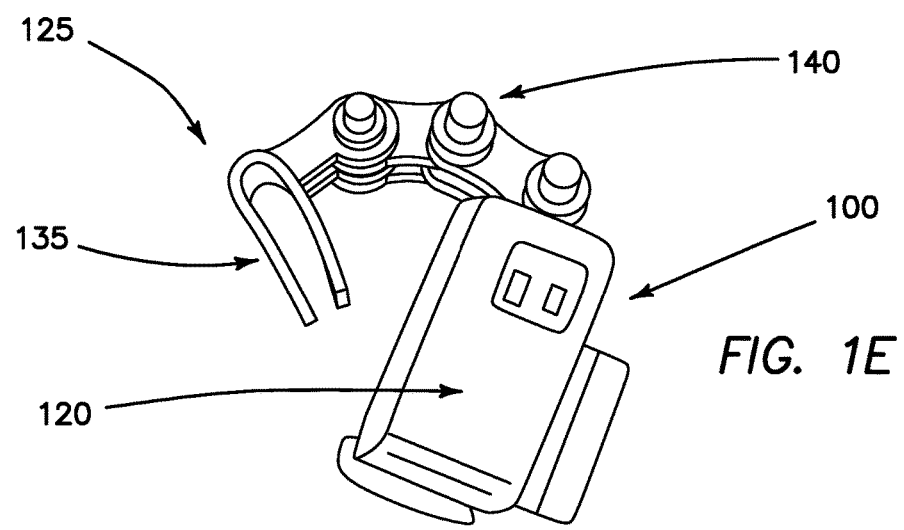

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

FIG. 1 shows a block diagram of a system 100 comprising broadly a head-worn apparatus 110, video camera 120, optional remote power source 130, optional remote video recorder 140 and remote video monitor 150. The system 100 detailed herein may be used with medical, dental, and surgical procedures and any other activity benefiting from point-of-view video capture and live monitoring of camera output.

Figure 2A:
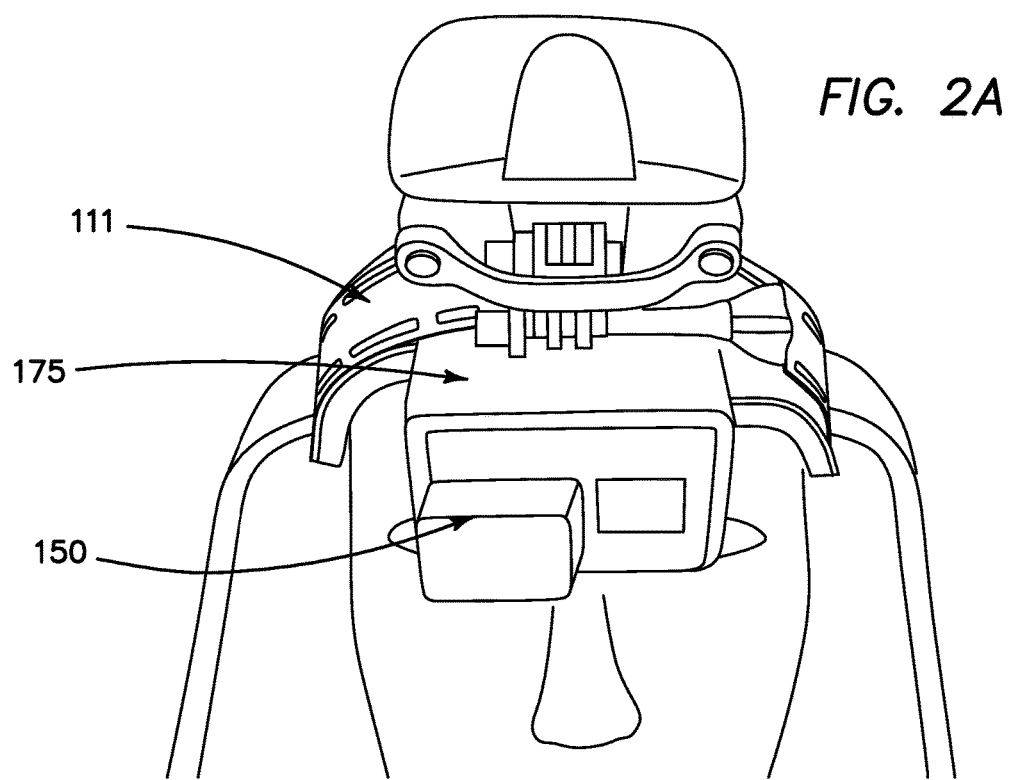
Figure 2B:
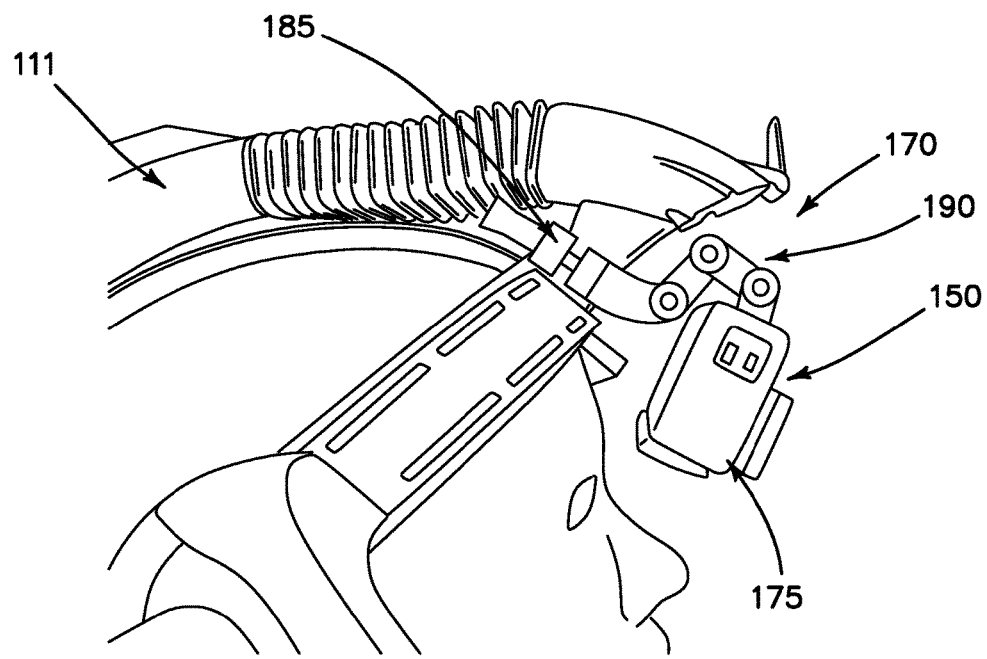
Figure 2C:
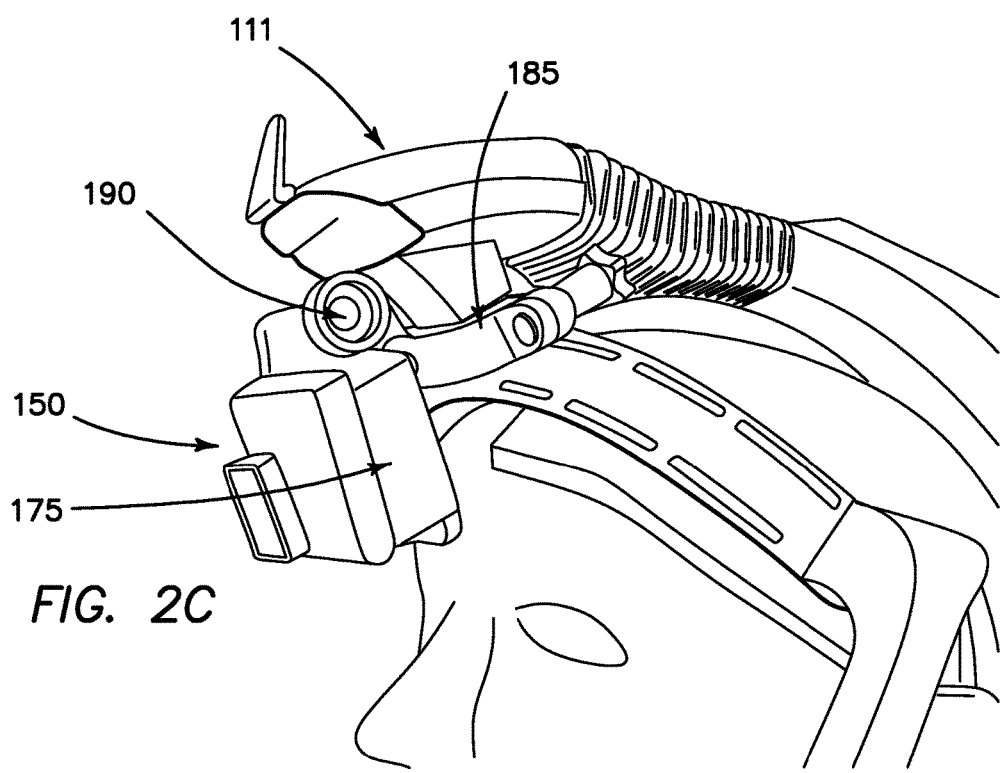
Figure 2D:
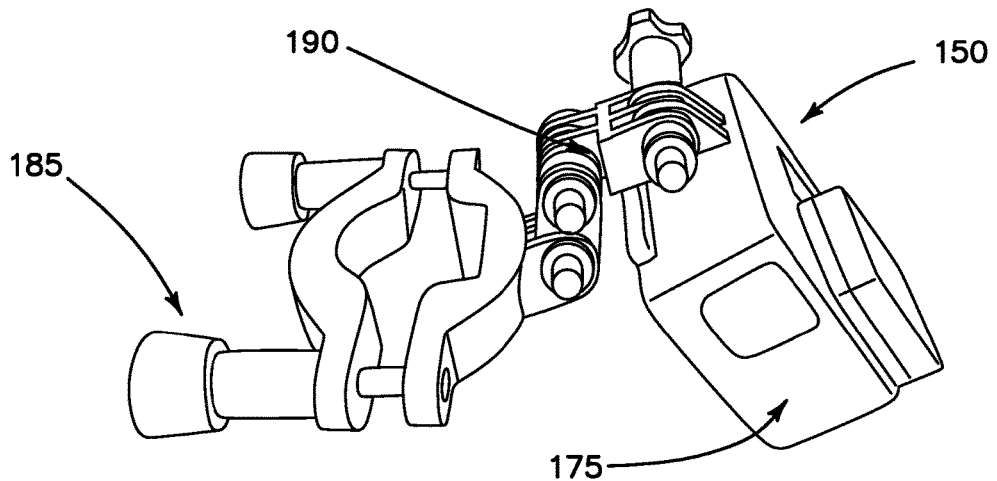

FIGS. 2A through 2F show an action video camera 120 attached to a head mount apparatus in the form of surgical head gear 110 with an articulating head band 115 customized with a fixed mount attached with the fixed mounting unit on the articulating band and positioned offset on the head band such that when the action camera, such as a GoPro Hero4® or Hero5® camera, is attached to the headband fixed mount with articulating arms and camera frame as outlined, the lens of the video camera 120 is centered on the articulating band thus positioning the lens 121 directly between the wearer's eyes at any height or angle as the headgear is adjusted. This provides true point-of-view perspective with an action camera with an offset lens. In one embodiment, as shown in FIGS. 2A through 2F, the action video camera 120 is a GoPro Hero4® video camera attached with a camera housing 119 (FIG. 2G). In another embodiment, the action camera is a modified GoPro Hero4® video camera that can accommodate magnification lenses and attached to the articulating arms with a ¼" screw on camera attachment 118. Those skilled in the art will recognize that attachment 118 allows universal attachment for other action video cameras to be used and even cellphones with a cellphone adapter allowing the lens of said cellphone camera to be centered between the wearers eyes. The offset fixed attachment may be on an articulating arm as described or fixed directly to the rim of the headgear. As best seen in FIGS. 2C and 2D, waist pack 123 is utilized to contain an external battery for powering the camera and other components attached to the headgear.

A customized action camera frame 119, or camera screw-on attachment 118, is configured to attach directly to fixed attachment mount 125 on the articulating band or to the fixed mount with one or more articulating arms, such that the frame 119 or screw attachment 118 is attached to an articulating arm 122 configured to attach to an articulating arm 123 configured to attach to articulating arm 124 configured to attach to fixed attachment mount 125 secured permanently to said surgical head mount adjustable articulating band 115. The camera frame 119 or camera screw attachment 118 and articulating arms 122, 123, 124 and fixed attachment mount 125 (best seen in FIGS. 2E through 2J) permit the video camera 120 to rotate at least upward and downward, including 360° rotation, to capture and/or transmit live video of any action, activity, or medical or surgical procedure from the vantage point desired by the wearer or medical professional (e.g., surgeon). Camera screw on attachment 118 allows 360° rotation of the camera 120. Headgear is designed to also allow attachment to fixed mount or articulating arms the standard action camera frame, such as a GoPro® housing or waterproof housing FIGS. 3A through 3G show the video camera 120 attached to a total joint arthroplasty helmet/hood 160 using the customized headband clip mount 126 and also using customized light clamp 170 in FIG. 3B and customized post clamp 171 in FIG. 3C and various articulating arms 122-124 according to the embodiments of the present invention. The customized headband clip mount 126 is attached to the headband 128 of an arthroplasty helmet 160 in FIG. 3D in one configuration of the present invention. The helmet/hood head mount apparatus 160 may be an arthroplasty helmet, isolation helmet, hazmat hood, surgical head light headgear, hard hat, or other head band type apparatus.

Figure 3A:
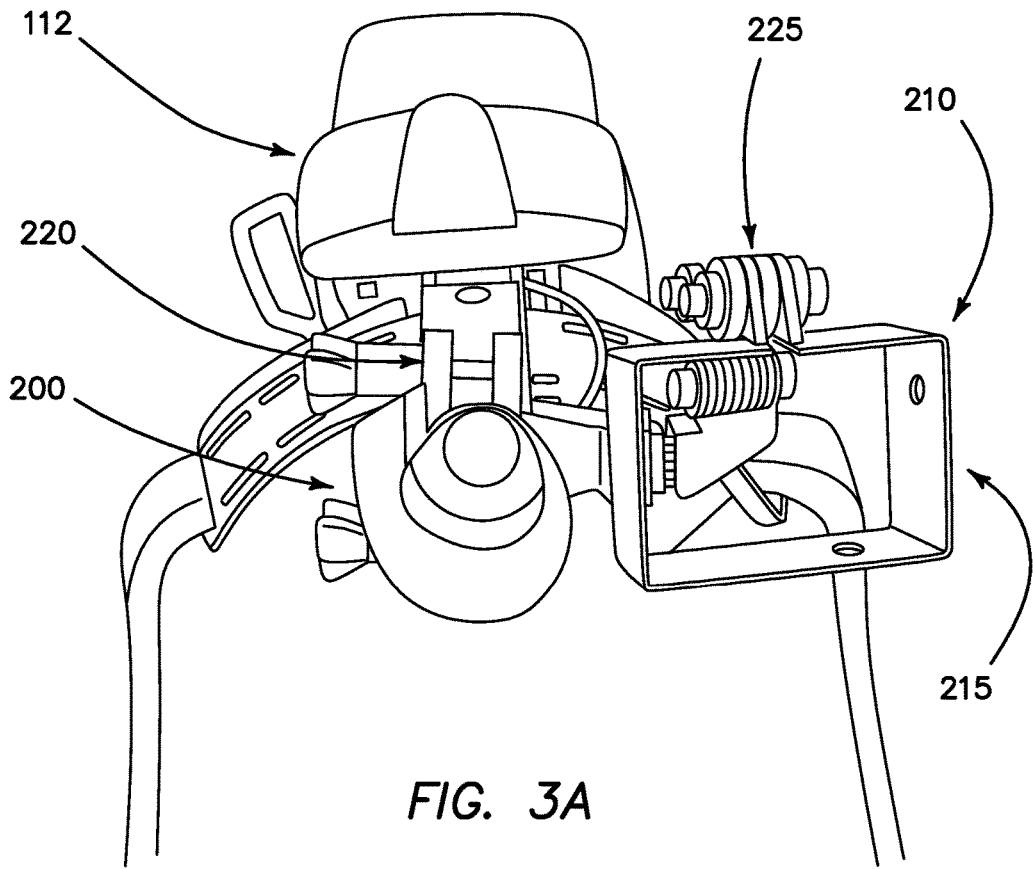
FIGS. 3A through 3G illustrate various views of the action camera attached to the custom headband clip, headlight attachment, and an arthroplasty helmet/hood according to the embodiments of the present invention.
Figure 3B:
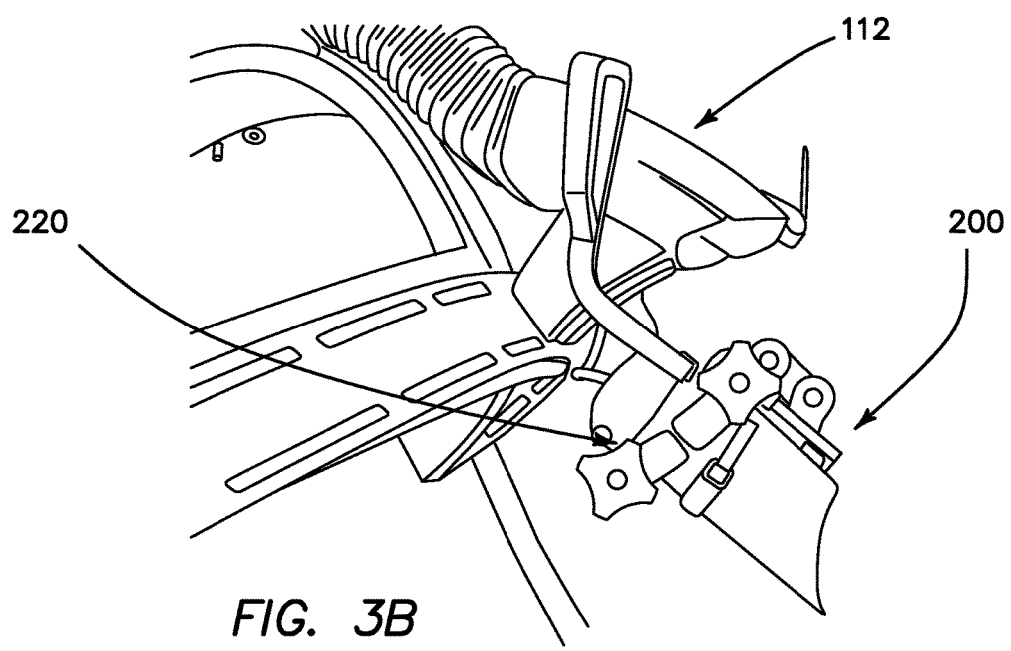
Figure 3C:
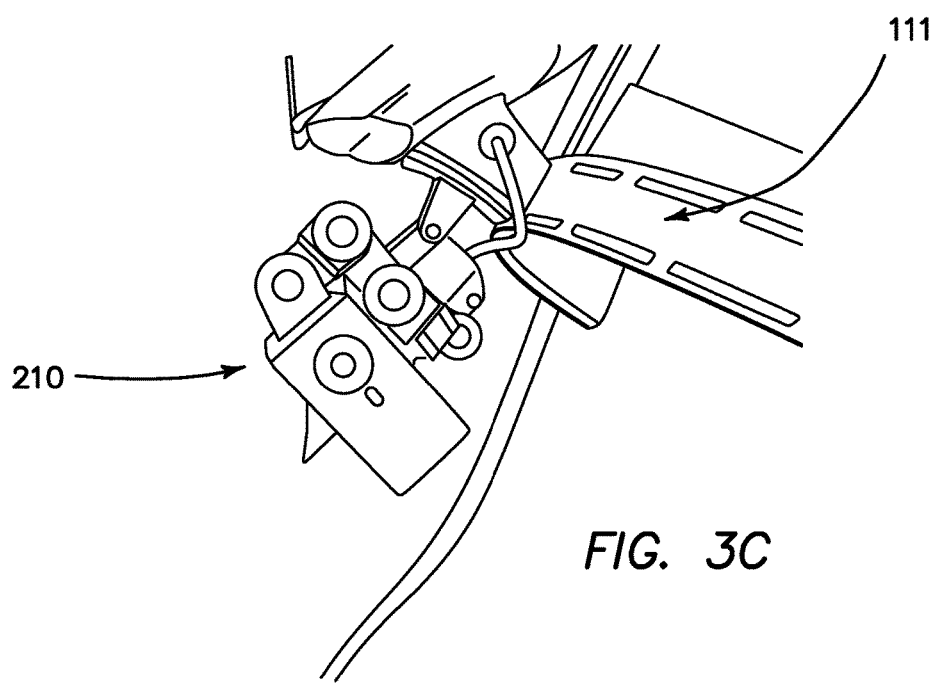
Figure 3D:
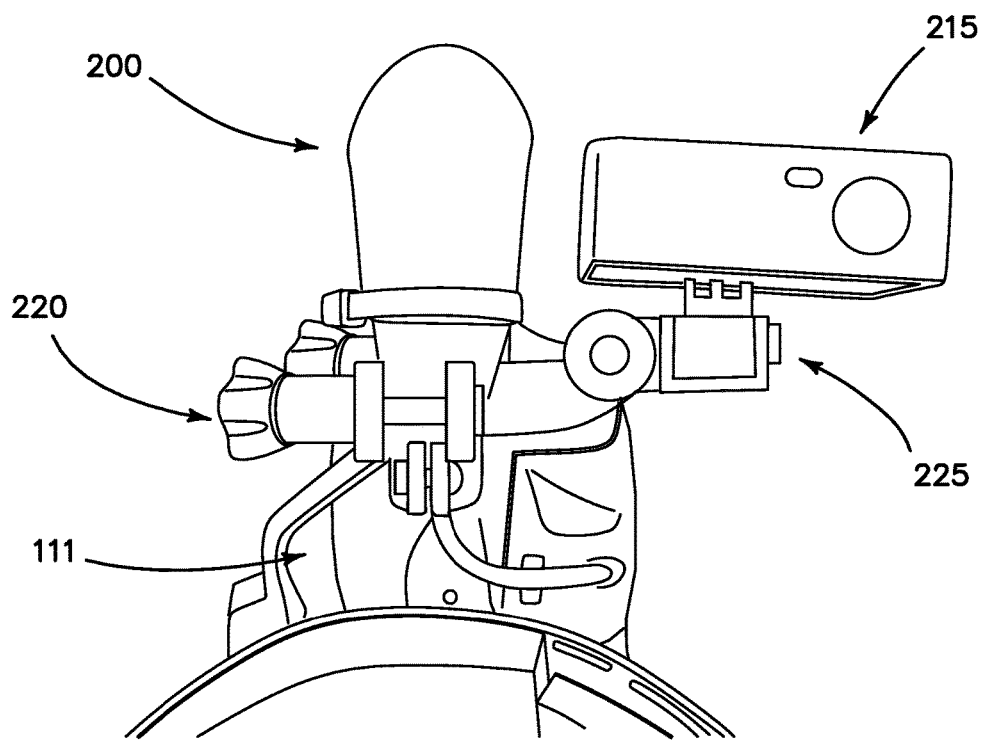
Figure 3E:
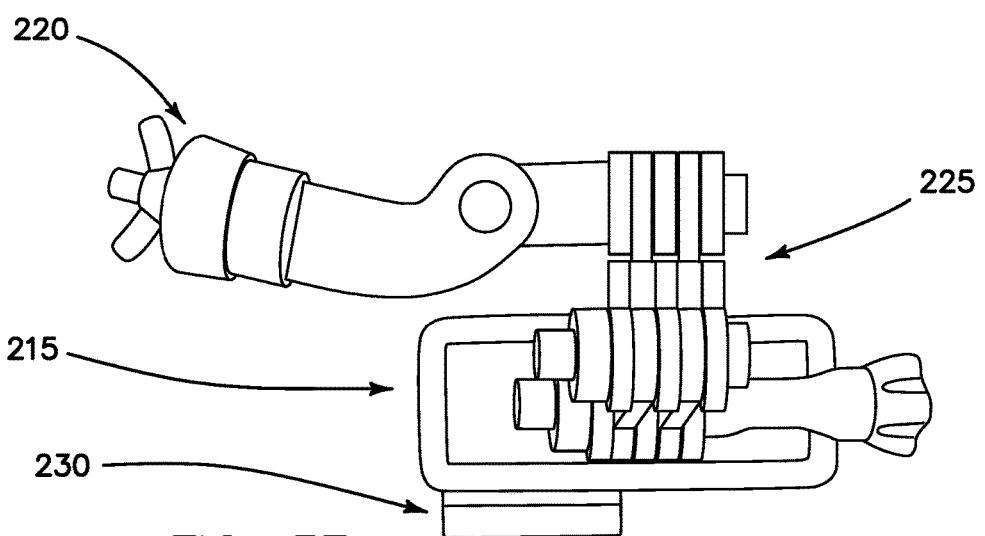
Figure 3F:
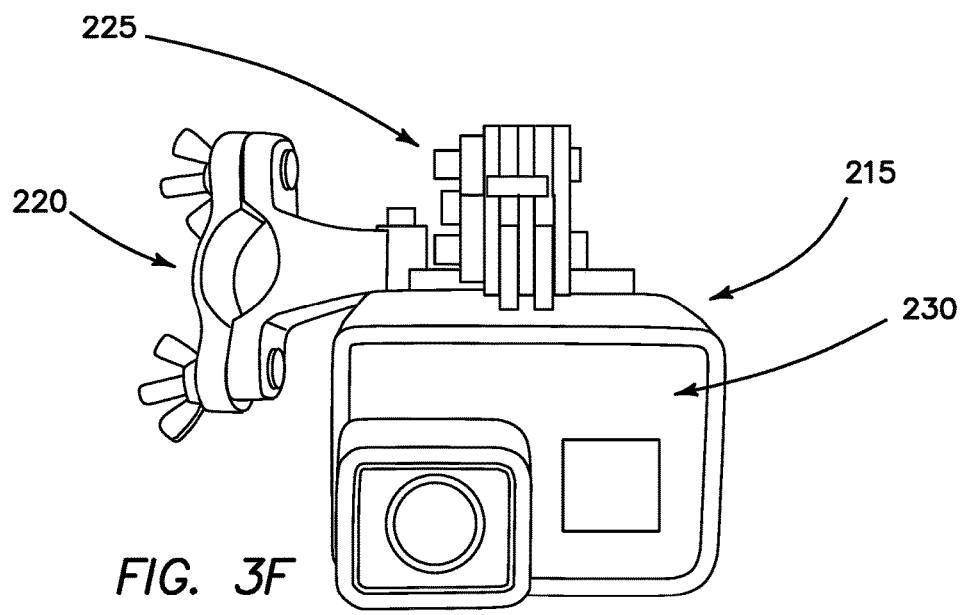
Figure 3G:
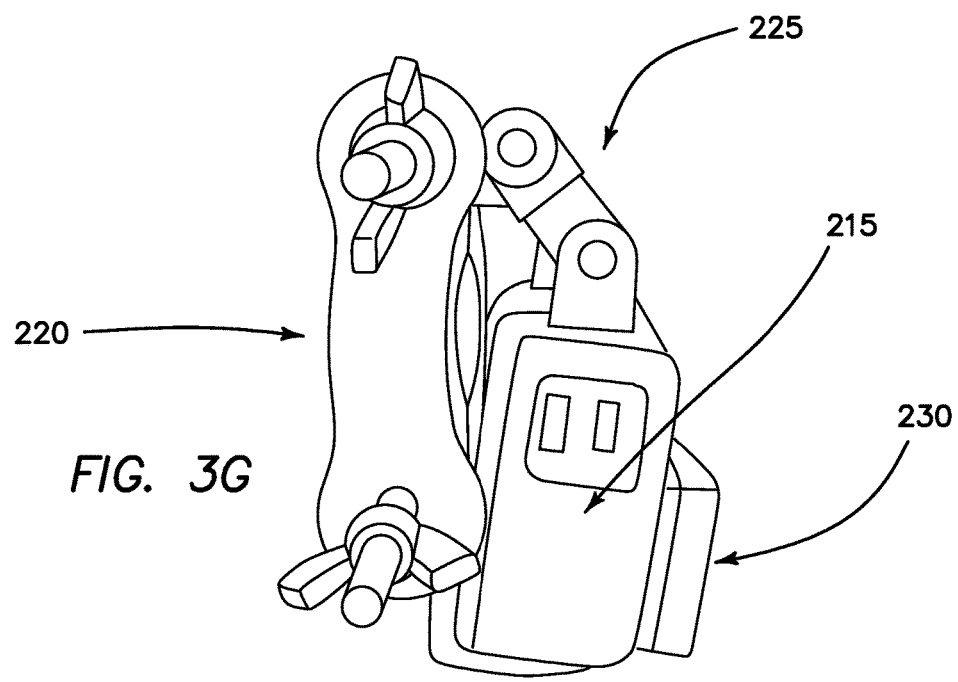

The clip mount 126, as best seen in FIGS. 3H through 3L, includes a U-shaped member 127 configured to slide over the headband 128 of various head mount apparatus, such as: surgical head lights, loupes, arthroplasty helmets, hard hats and isolation helmets, and any other head band apparatus. The clip mount 126 includes a series of extensions 129 providing means for receiving one or more of the articulating arms 122-124, in series, which have mating extensions which are received by the spaces 130 defined by the series of extensions 129. FIGS. 3E and 3F show a series of articulating arms 122-124 connecting the camera to the headgear. It can also directly receive the camera frame 119 or camera threaded attachment 118, which also have mating extensions which receive the spaces 130 defined by the series of extensions 129. The inside of the clip mount 126 that may come in direct or indirect contact with the wearer's head may be shaped and padded for a comfortable fit. The articulating arms 122-124 are attached to either the camera housing 119 or the camera attachment screw mount 118. In this manner, various sports action cameras, 360 degree cameras, and cell phones 120 may be rotated upward and downward and/or side-to-side as the articulating arms 122-124 rotate relative to the U-shaped member 127 for optimum camera placement and lens angle. The rotation is facilitated by interlacing of the extensions 129 of the clip mount 126 and the articulating arms 122-124, and mount 118 or housing 119 with a bolt or similar item passing therethrough. These articulating arms may be replaced with other articulating arms, of various materials and design, that function in the same manner to allow adjustment of the camera angle and rotation.

FIGS. 3M through 3O show a video camera lens 155 separated from the video camera body 156 and connected thereto via a cable. In this manner, the video camera lens 155 may be positioned without interference from the larger video camera body 156.

The short battery life associated with sports/action video cameras makes shooting a long surgery, medical procedure, or other long activity cumbersome as batteries need to be changed at a critical point in the procedure, as well as in a sterile environment by a doctor or medical professional wearing gloves and scrubs. This results in either a break in the video and a delay in the procedure or more commonly, the procedure is not recorded past this point since the surgeon, physician, or other wearer is focused on the surgery or activity and not video. Therefore, the system 100 detailed herein includes a remote battery/power supply 131 connected to said video camera 120. In one embodiment, a USB cable power supply 139 is used to facilitate the connection between the video camera 120 and remote battery/power supply 131. The remote battery/power supply may have 10+ hours of life which allows lengthy and complicated activities, procedures and surgeries to be recorded or shown live on monitors for the entire surgery day without having to ever change the camera battery.

Similarly, the relatively short recording capability associated with sports/action video cameras makes shooting a long surgery or multiple surgeries, medical procedures, or other lengthy, tedious, and complicated activities (diamond cutting, jewelry making, wood carving, etc.) cumbersome as memory cards need to be changed frequently or in a sterile environment by a doctor or medical professional wearing gloves. Additionally, the inability of sports/action cameras to send zero latency live view output to an external monitor or recorder wirelessly to allow observers to see exactly what the wearer sees at the same time, limits the educational benefit of using said cameras in a wireless, untethered method while providing live video output for observers to monitor or record.

Figure 6A:
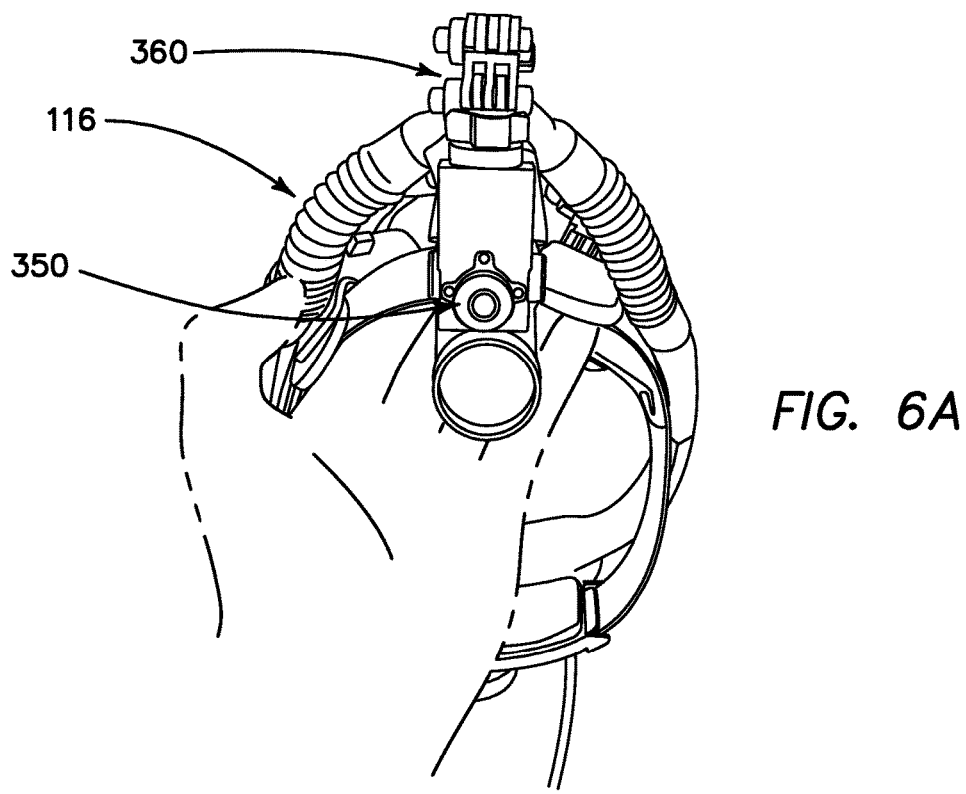
FIGS. 6A and 6B illustrates an external recorder for use with the embodiments of the present invention.
Figure 6B:
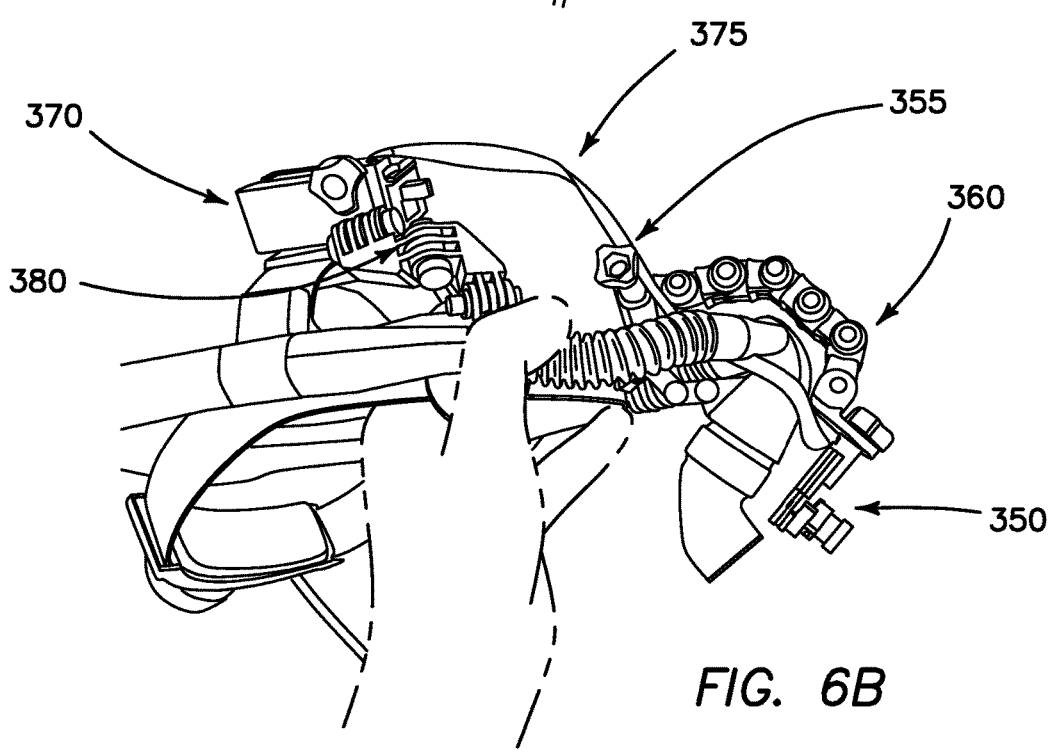

Therefore, due to these limitations, the system 100 detailed herein includes a zero latency wireless, battery powered, HDMI transmitter unit to wirelessly send the sports/action camera live video output to its paired HDMI receiver base station (e.g., Iogear HDMI transmitter/receiver system, or other HDMI transmitter/receiver system). The wireless HDMI video base station is connected to either or both a video display or display system (such as an operating room video system, TV or monitor) and a remote video recorder 140 (e.g., Atomos Ninja2®, Ninja Blade®, operating room video recording system, endoscopy camera system or other such external recorder—see FIG. 6).

The wireless HDMI video receiver 142 is connected to said video recorder with an HDMI to HDMI cable. The sports/action camera 120 is connected to the HDMI wireless video transmitter 143, secured in the waist pack with external battery, via a micro HDMI to HDMI cable connected to head gear or other head mount apparatus as described with this invention.

Figure 4A:
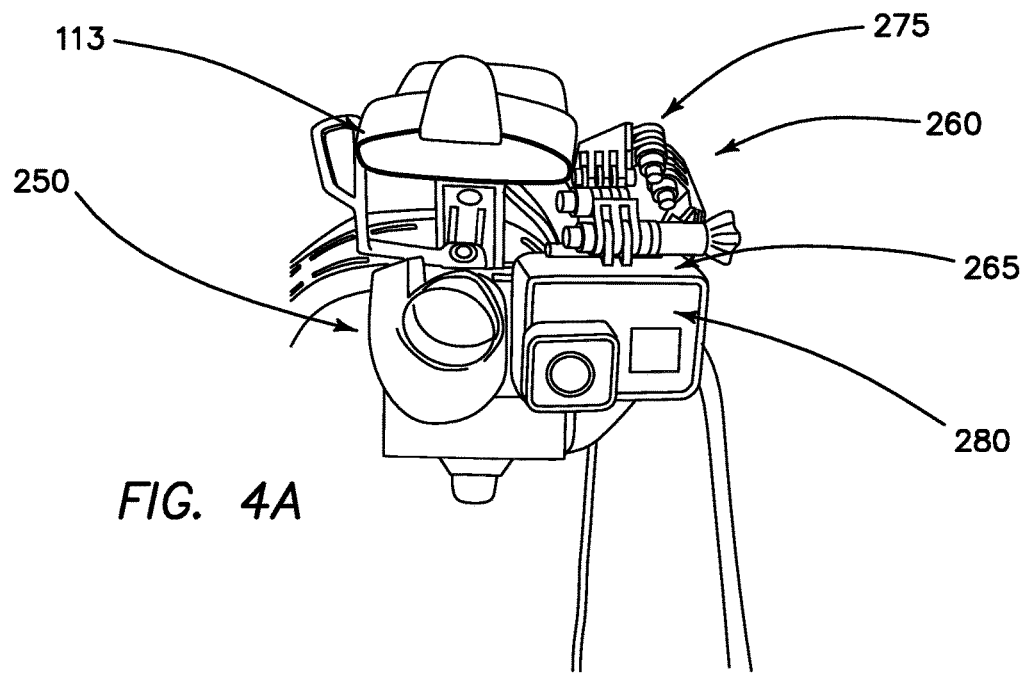
FIG. 4 illustrates a customized USB plug with audio microchip that prevents audio recording by an action camera such as a GoPro Hero4 camera, according to the embodiments of the present invention.
Figure 4B:
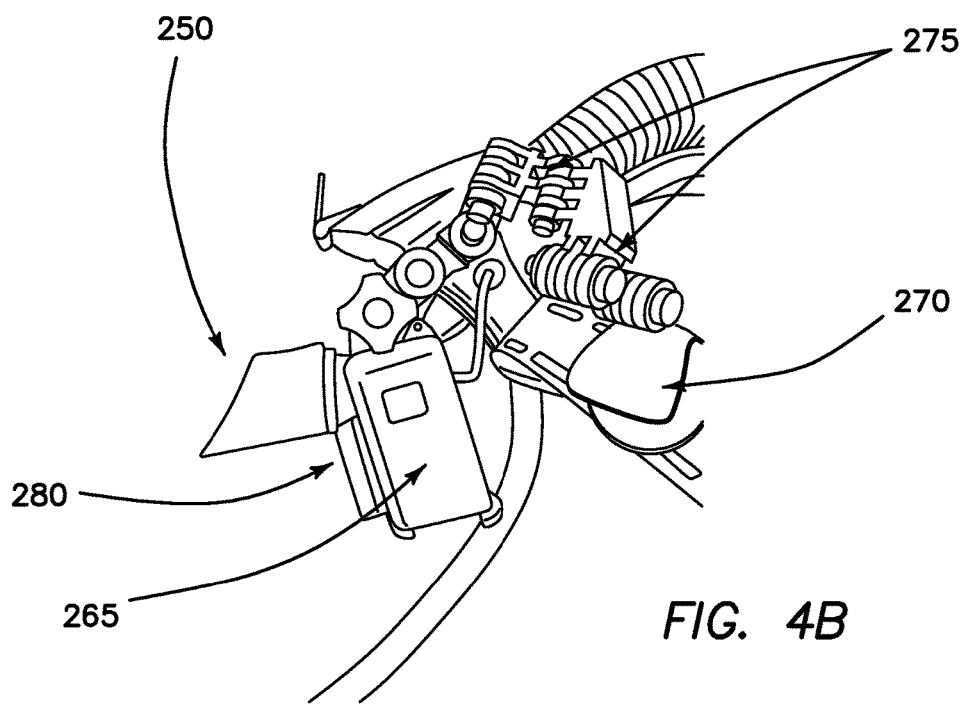
Figure 5A:
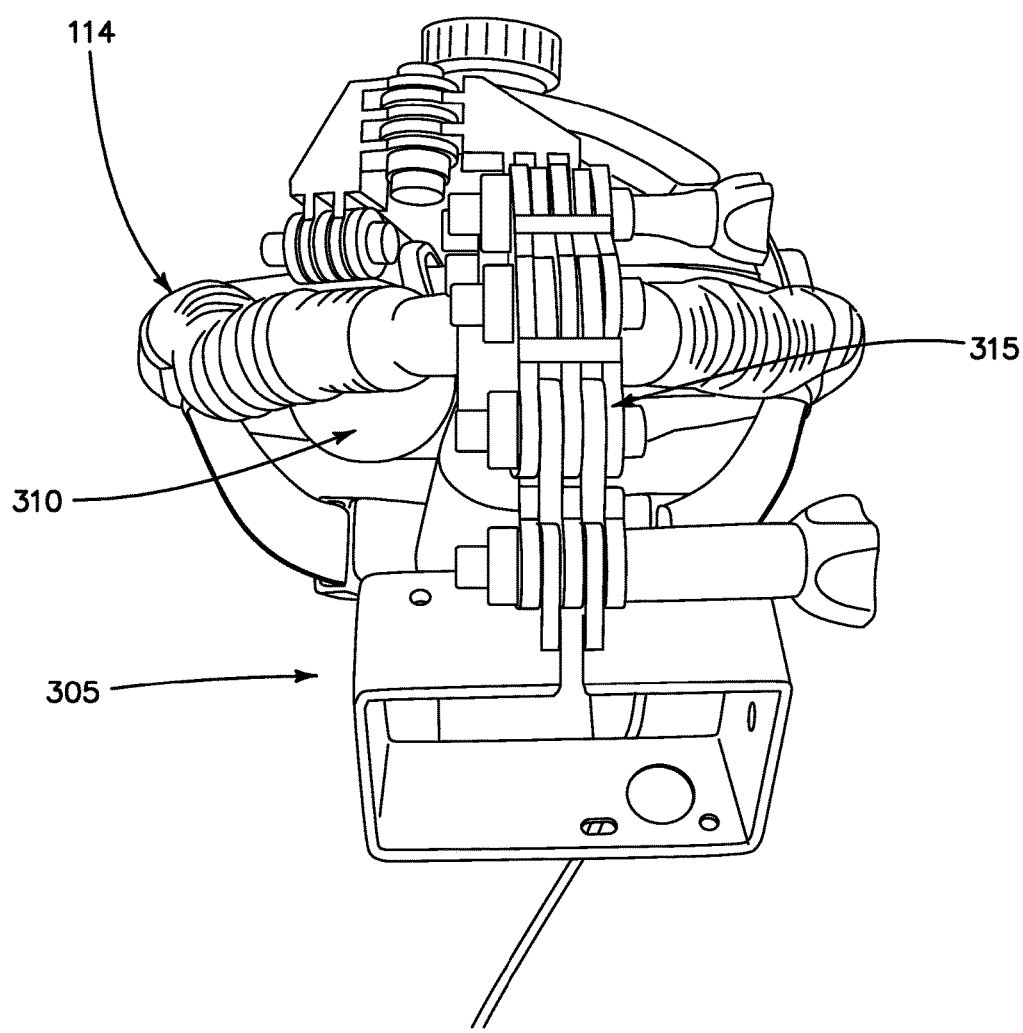
FIGS. 5A and 5B illustrate a waist pouch for use with the embodiments of the present invention.
Figure 5B:
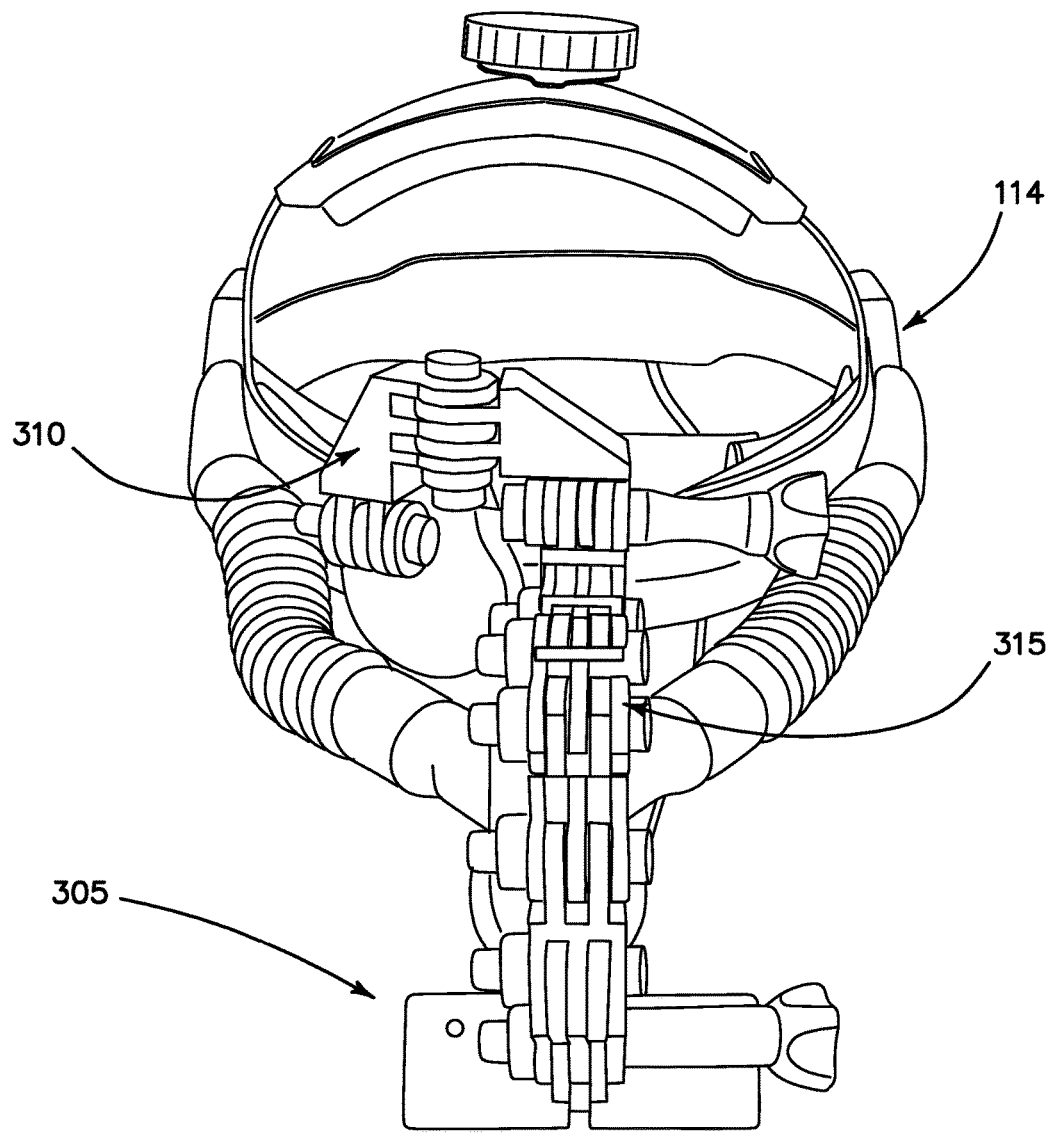

Video recording with the professional remote video recorder included with this invention can be with external portable SSD/HDD drives in an uncompressed format. The remote video recorder 140 with said portable drives has sufficient memory to store uncompressed, professional level video, unlike portable video camera 120, for subsequent professional level editing and image modification. Additionally, if said wireless video receiver 142 is attached to another video recorder, such as an OR video system or endoscopy camera, video output of the camera can be displayed live on the video displays of those systems and allow recording into said systems. The video receiver 142 can also be connected directly to a TV or other monitor for monitoring only without recording. Those skilled in the art will recognize that other remote video recorders and portable drives may be used. Additionally, as shown in FIG. 4, to prevent audio recording, if desired, a specialized USB attachment 133 with included audio microchip is inserted into the camera USB port of the Hero 3+/4.

Enabling the wearer to assess and adjust the angle and focus of the video camera 120 or modified video camera tethered lens 180 a hand held portable video monitor 150 may be connected directly to the video camera 120 temporarily or remotely via the video receiver unit 140. The remote video monitor 150 allows the wearer, such as a surgeon, to ensure the video camera 120 or tethered lens 155 is properly positioned to capture their desired point-of-view of the activity, procedure or surgery. Additionally, a high definition portable monitor allows the wearer to adjust the focus and depth of field of attached lenses to a modified sports/action camera to ensure the desired image is in sharp focus. Observers, as in the case of a surgical procedure such as other medical professionals, students, residents or faculty or the like may also be able to view the procedure from surgeon's perspective via the remote video monitor either tethered to the sports/action camera via an HDMI union or splitter in the wearer's waist pouch or as previously described via wireless transmission to the based station attached to another external monitor or monitor system. HDMI cables may connect the remote video monitor 150 to the video camera 120 or remote video recorder 140. HDMI data transmitters and data receivers may also permit wireless data to be sent and received as previously described.

Flexible tubing 135 contains USB battery cables and HDMI cables and any others extending from the video camera 120 to remote devices. An accessory waist belt includes a pouch 175 for holding certain hardware including the remote battery/power supply 130 and HDMI wireless video transmitter. Positioning the wireless video transmitter in the pouch 175 of the accessory waist belt 170 allows untethered movement of the wearer with no external cords to connect to a monitor or video recorder. For example, a surgeon can move freely around the patient or throughout the operative field without any wired connection between the surgeon and external monitors, TVs and the operating room video recording system.

FIG. 7 shows a flow chart 200 associated with one methodology of using the system 100 described herein. At 205, the surgeon or other medical professional puts on the surgical head mount with camera 110 and power pack accessory belt 170. At 210, the video camera 120 may be adjusted to capture the correct viewpoint from the surgeon's perspective as well as adjust focus using the monitor on the external recorder 140 or on an external portable monitor 150. At 215, the surgeon or staff member or observer taps the record button on the interface 141 of the remote video recorder which may be wired or wirelessly connected to the camera output via transmitter 143 and receiver 142. At 225, the remote video monitor 150 is monitored by staff, students or other observers. At 230, in an alternative embodiment, a HDMI transmitter is attached to the HDMI output of the video camera 120 and a HDMI receiver is attached to the remote video monitor 150 to receive the video output.

Figure 8A:
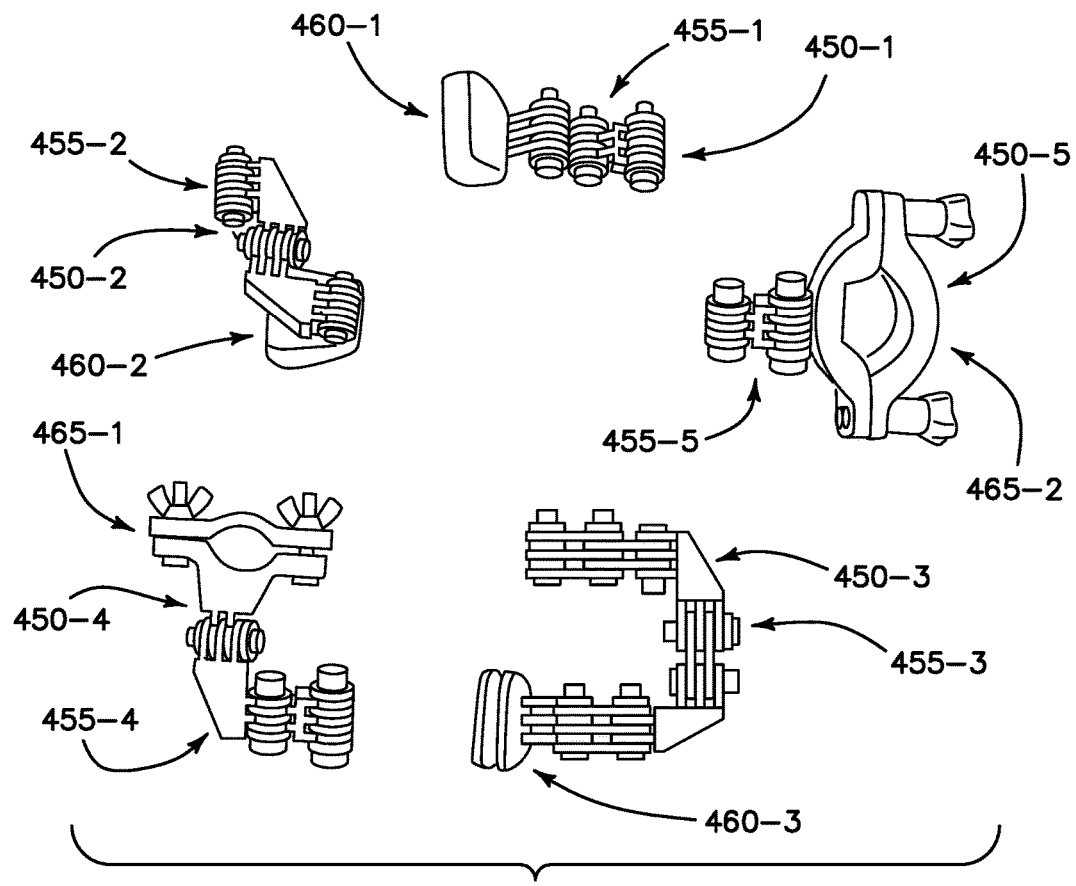
FIG. 8 illustrates a flow chart of another methodology according to the embodiments of the present invention.
Figure 8B:
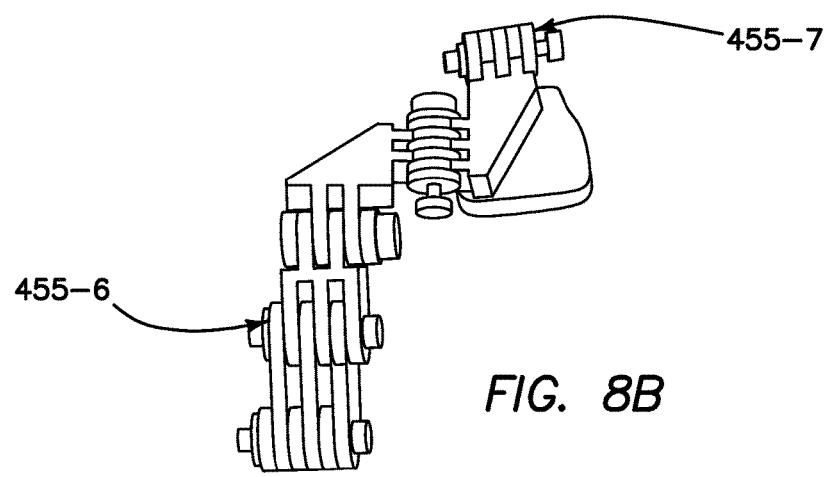

FIG. 8 shows a flow chart 250 associated with a joint replacement, surgical headlight, or other headband apparatus methodology. At 255, the camera system is attached to a headband inside an arthroplasty helmet or surgical headlamp band using a customized headband clip mount or customized action camera tubular post clamp. At 260, articulating arms attached. At 265, the camera 120 attached to the articulating arms. At 270, camera 120 adjusted. At 275, camera 120 tightened. At 280, incorporate optional remote video recorder.

Figure 9A:
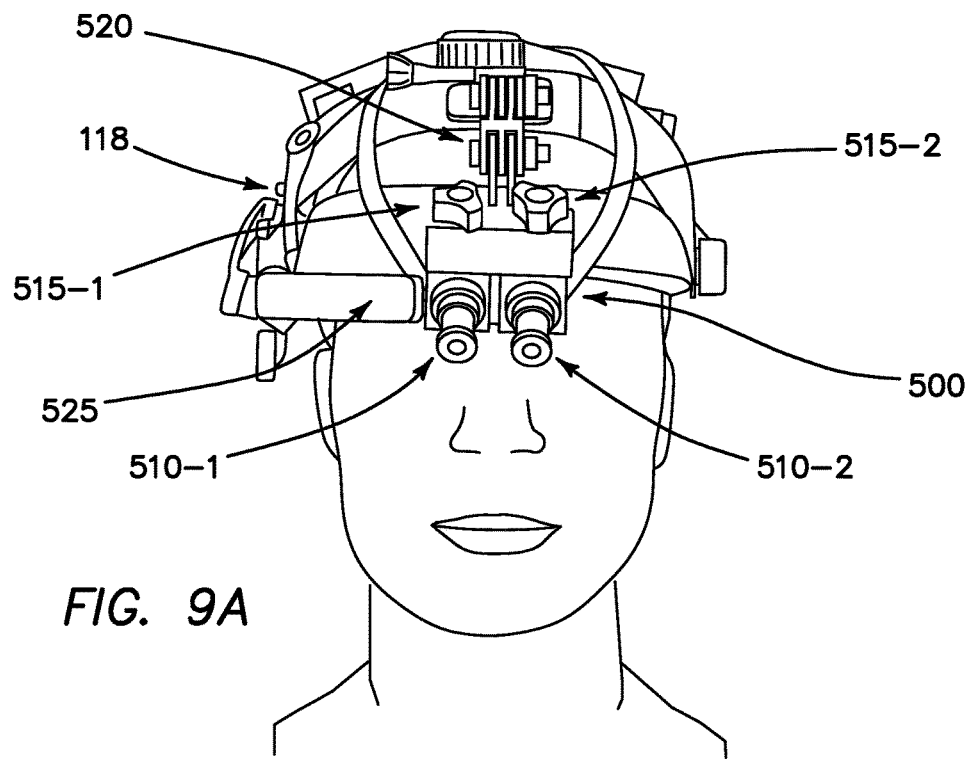
FIGS. 9A and 9B illustrate an action camera attached to two types of total joint arthroplasty helmets according to the embodiments of the present invention.
Figure 9B:
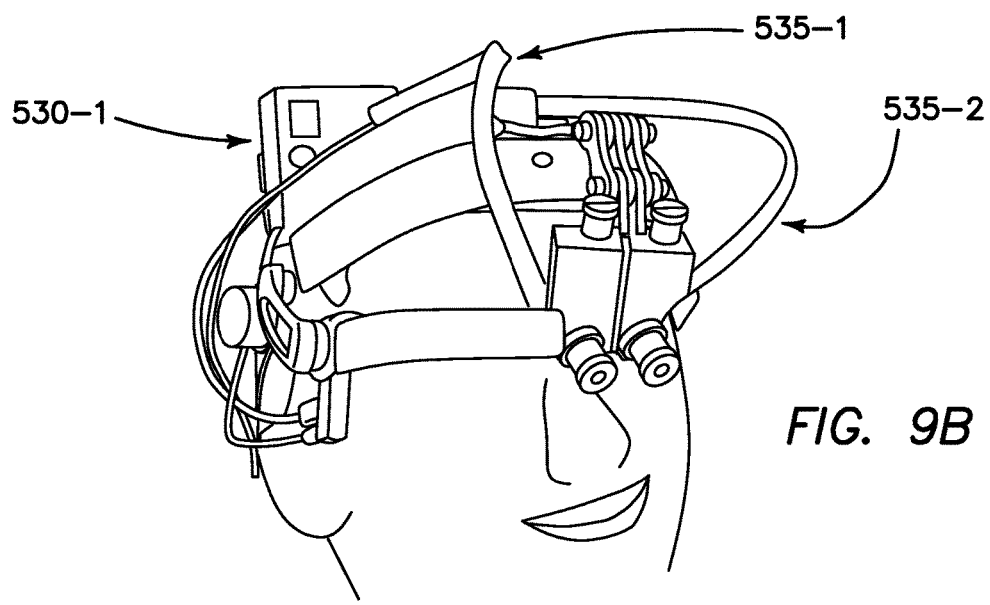
Figure 9C:
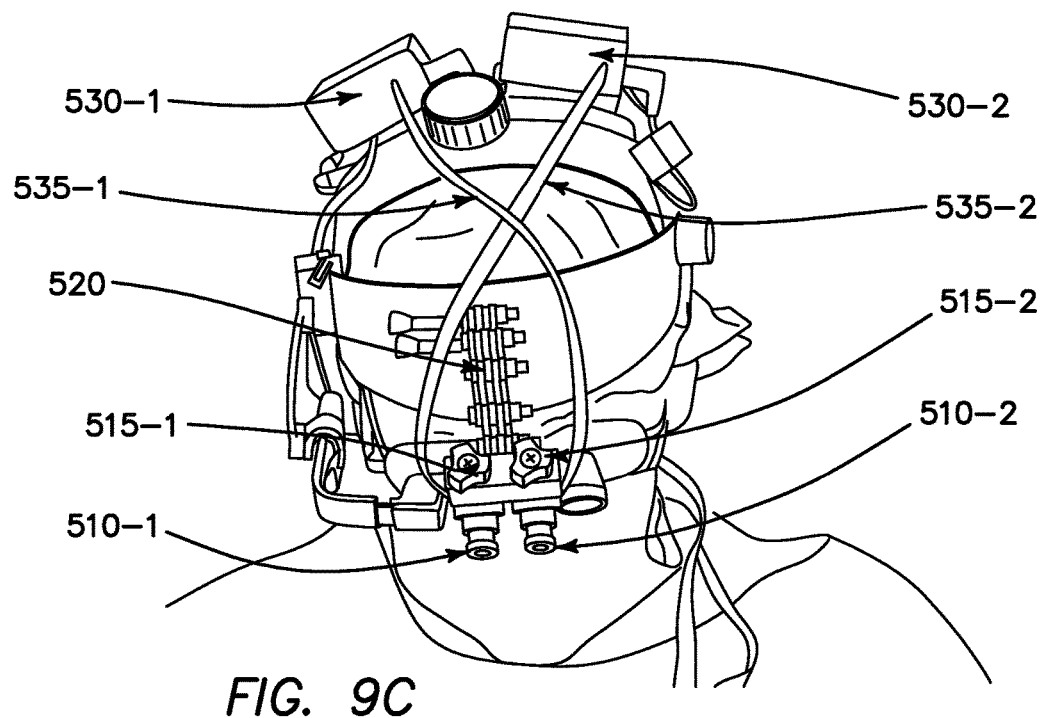
Figure 9D:
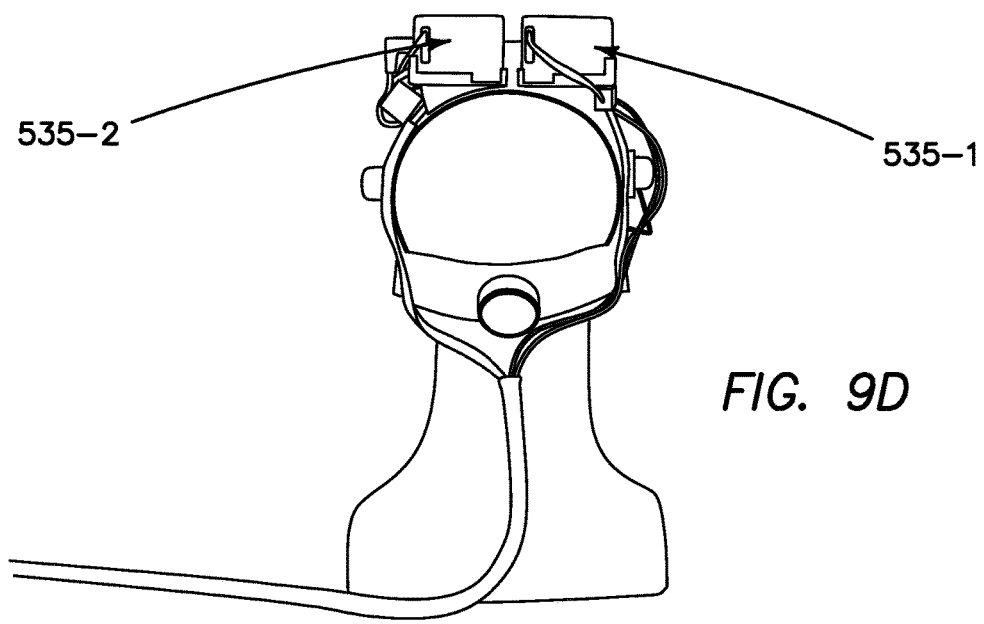
Figure 10A:
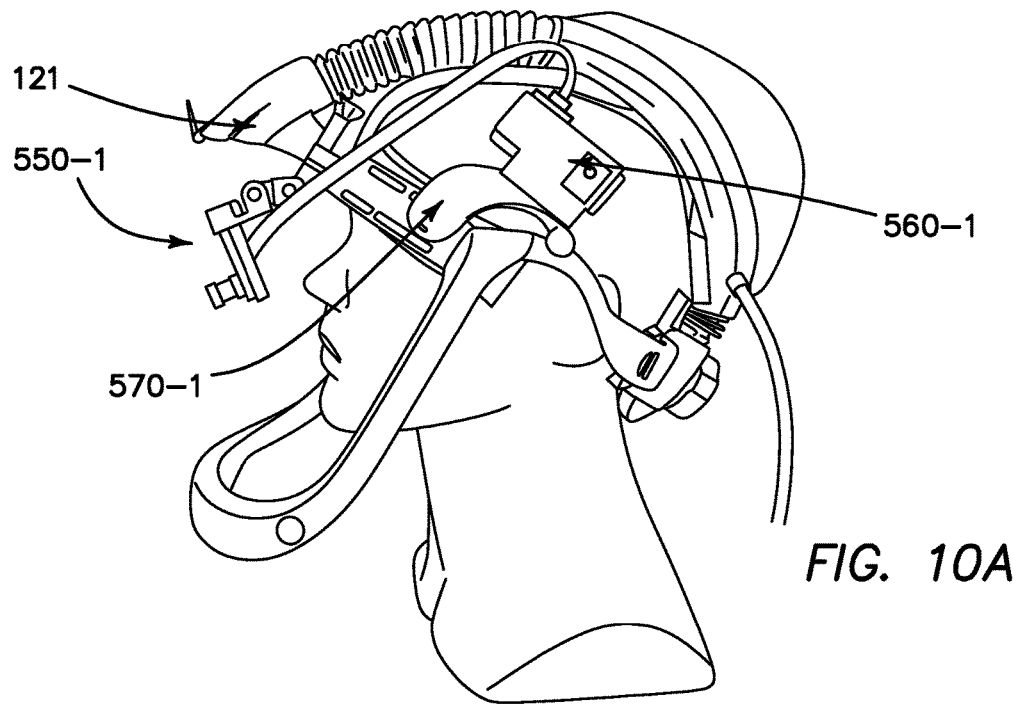
FIGS. 10A through 10D illustrate a custom action camera video system with lens separated from the camera attached to two types of total joint arthroplasty helmet according to the embodiments of the present invention.
Figure 10C:
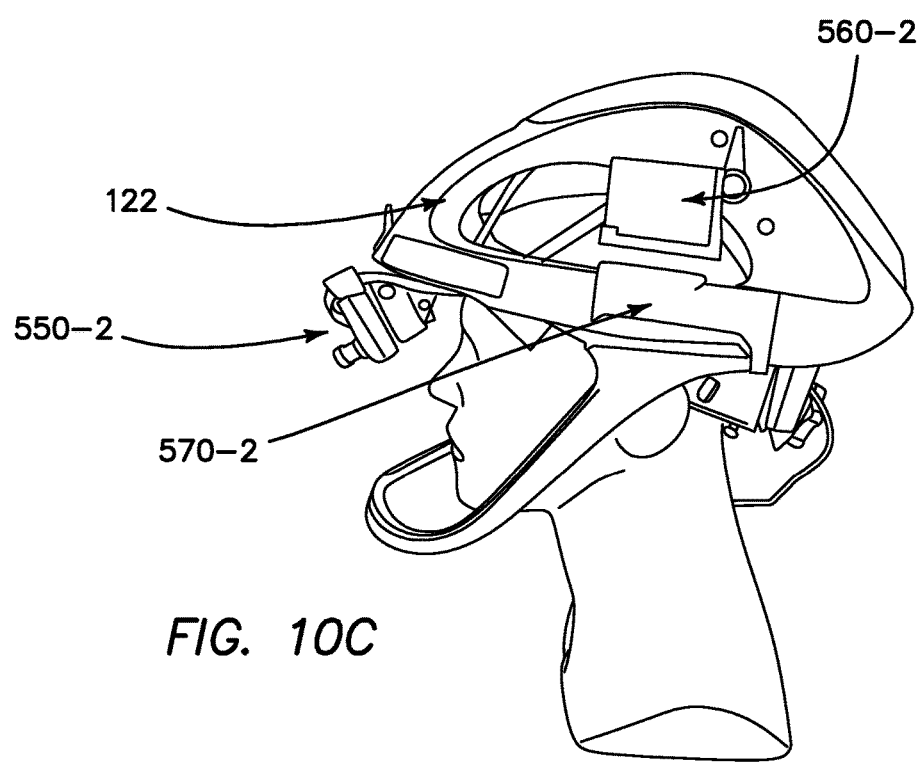
Figure 10B:
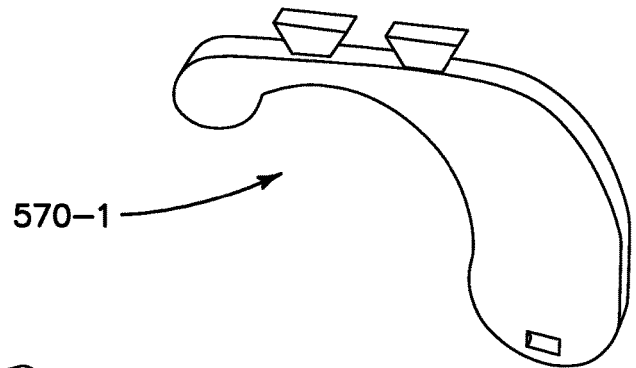
Figure 10D:
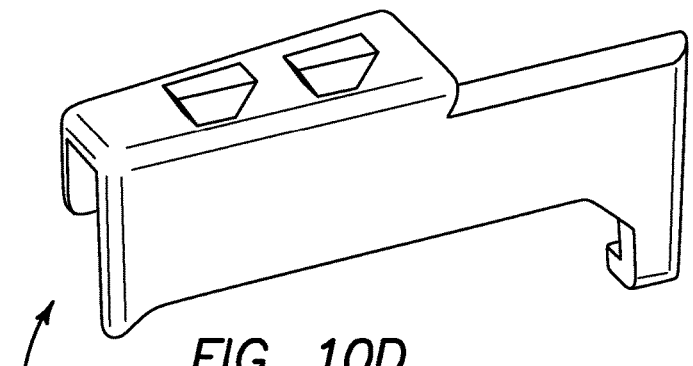

FIGS. 9A and 9B show a video system attached to a helmet according to the embodiments of the present invention. In this embodiment, camera 300 is rotatably mounted to an underside of the helmet 305. Cable 310 is optionally connected to an external HDMI transmitter 143 to transmit camera data to HDMI wireless receiver 142 and then attached to a recorder and/or monitor.

FIGS. 10A through 10D show another video system attached to a helmet 325 according to the embodiments of the present invention. In this embodiment, the separated lens 320 from a GoPro Hero4® or other sports camera 330 is rotatably mounted to an underside of the helmet 325.

Figure 11B:
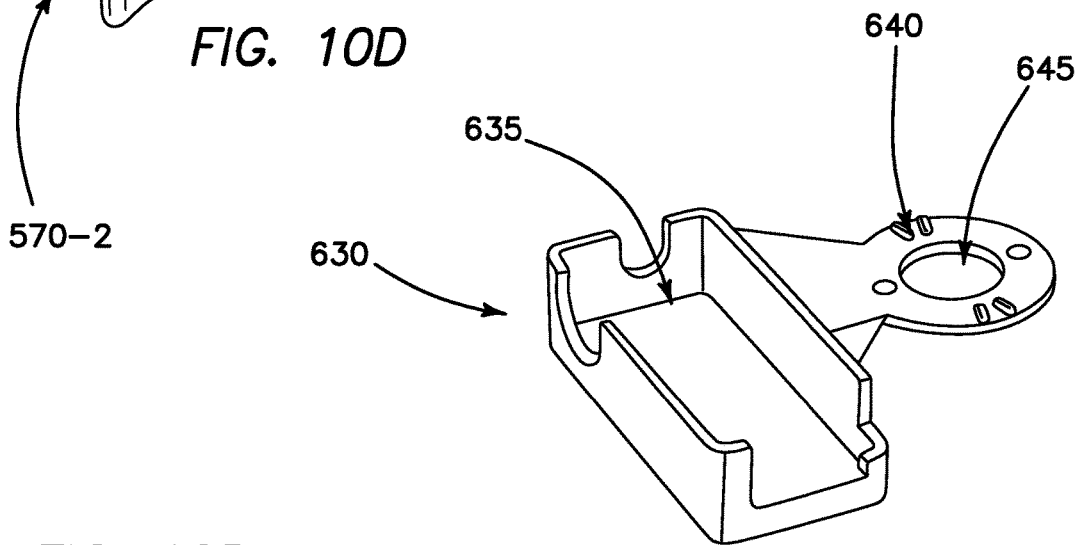
FIG. 11 illustrates a side view of a custom action camera video system with lens separated from the camera by a tethered reinforced cable and attached to customized head gear to allow the lens to be adjusted to the angle of the wearer's view according to the embodiments of the present invention.
Figure 12B:
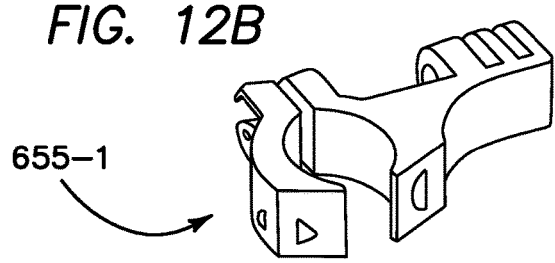
FIG. 12 illustrates a close up side view of the articulating arms, lens attachment and optional light attachment of the custom video system action camera video system with lens separated from the camera by a tethered reinforced cable and attached to customized head gear to allow the lens to be adjusted to the angle of the wearer's view according to the embodiments of the present invention.
Figure 11A:
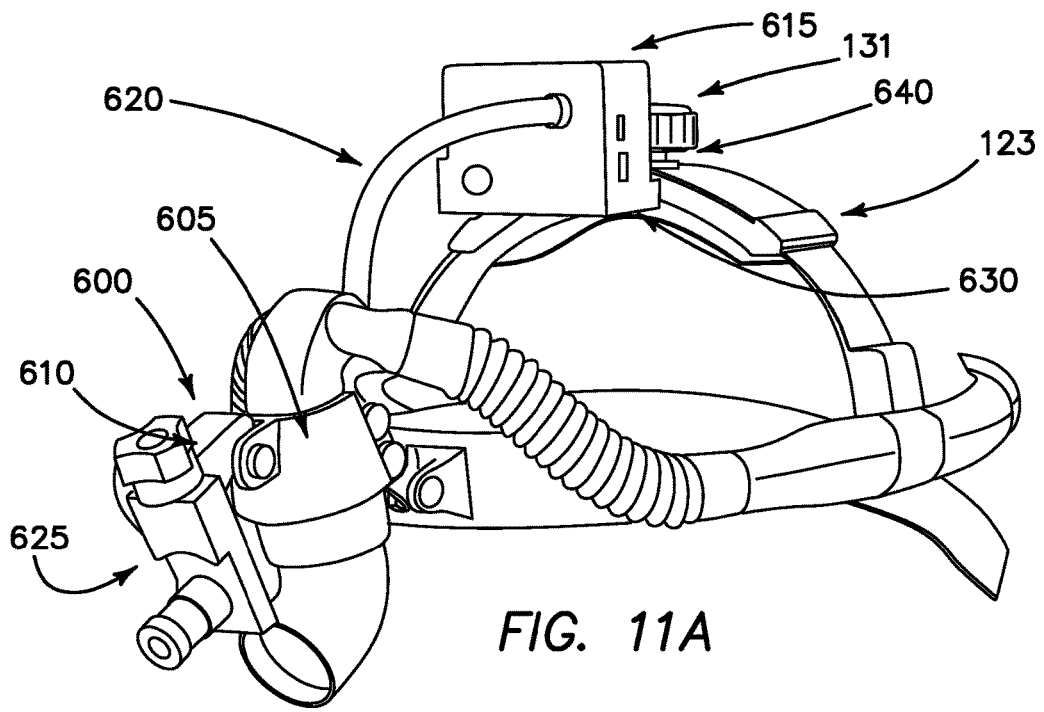
Figure 12A:
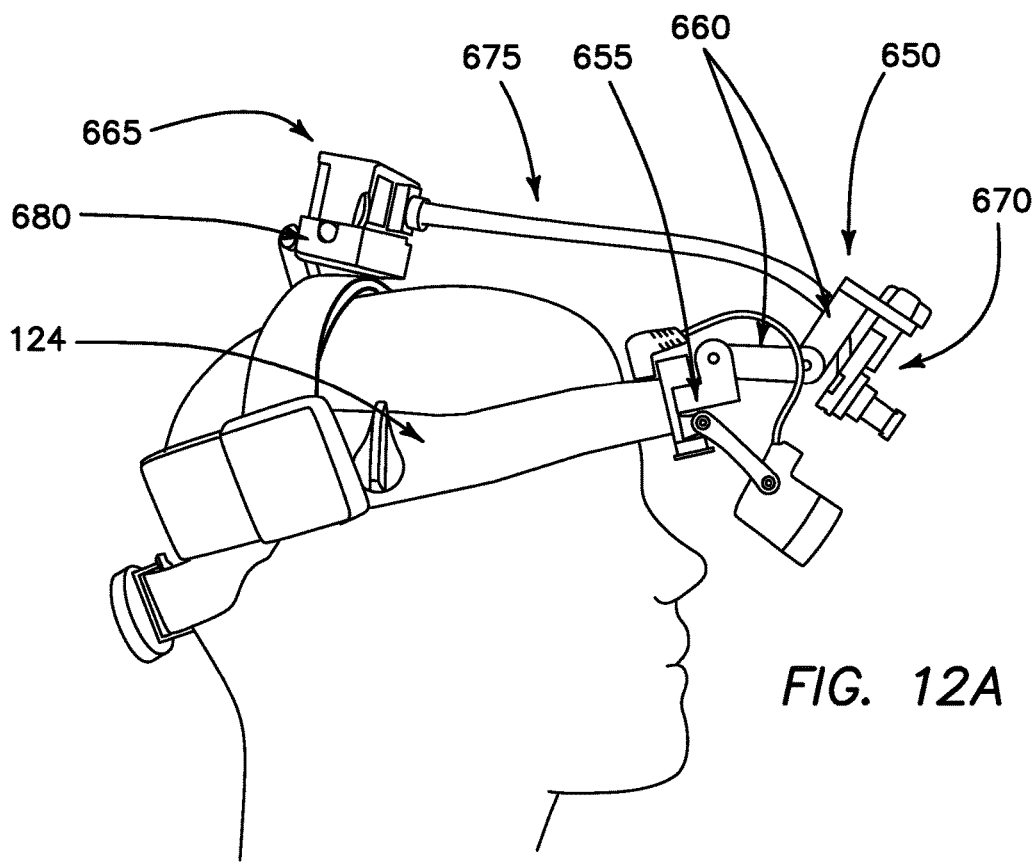
Figure 12C:
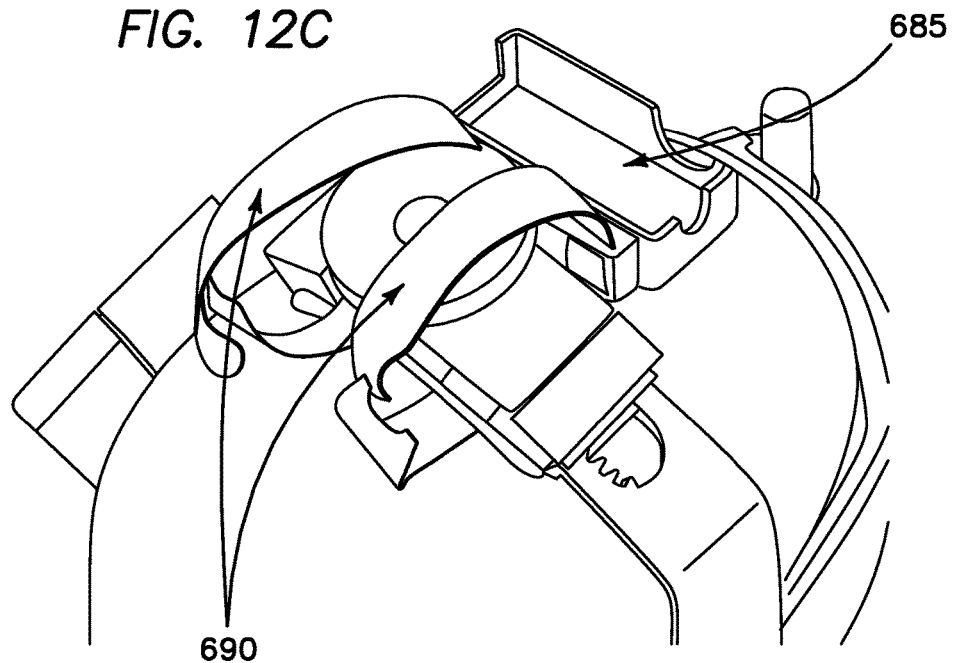
Figure 12D:
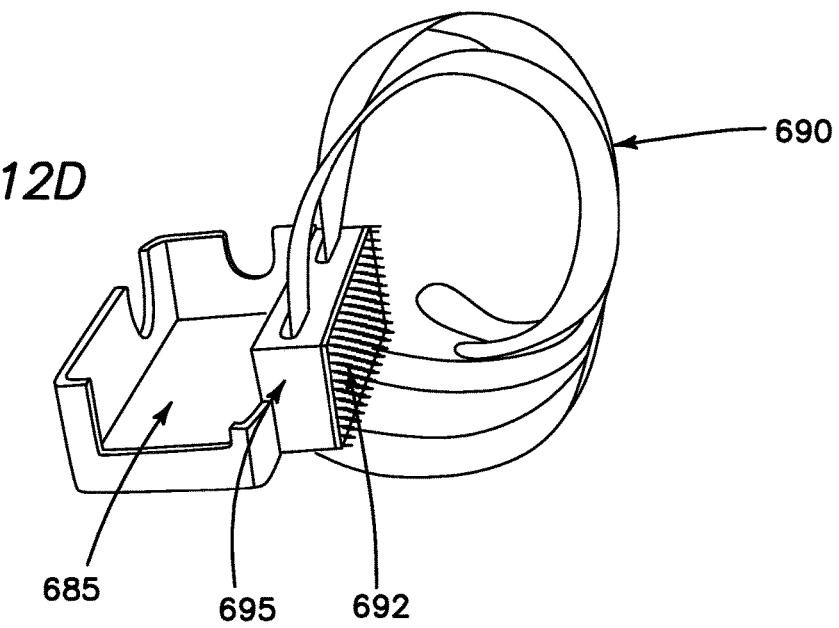

FIGS. 11 and 12 show a camera system according to the embodiments of the present invention. A fixed mount 400, attachment members 405-1 through 405-3 and a camera mount 410 create a system for the video camera lens 420, separated from video camera body 430, to movably mount to the head-worn apparatus 415. Each of the attachment members 405-1 through 405-3 are rotatably attached to one another and the fixed mount 400 and camera mount 410. The attachment members 405-1 through 405-3 have the extensions which interlace with one another (see FIGS. 2H through 2M). In this manner, the video camera lens 420 may move up, down, and/or outward, and rotate as desired by the wearer. A light 425 is positioned to provide illumination to the area of the medical procedure or other activity.

Figure 13A:
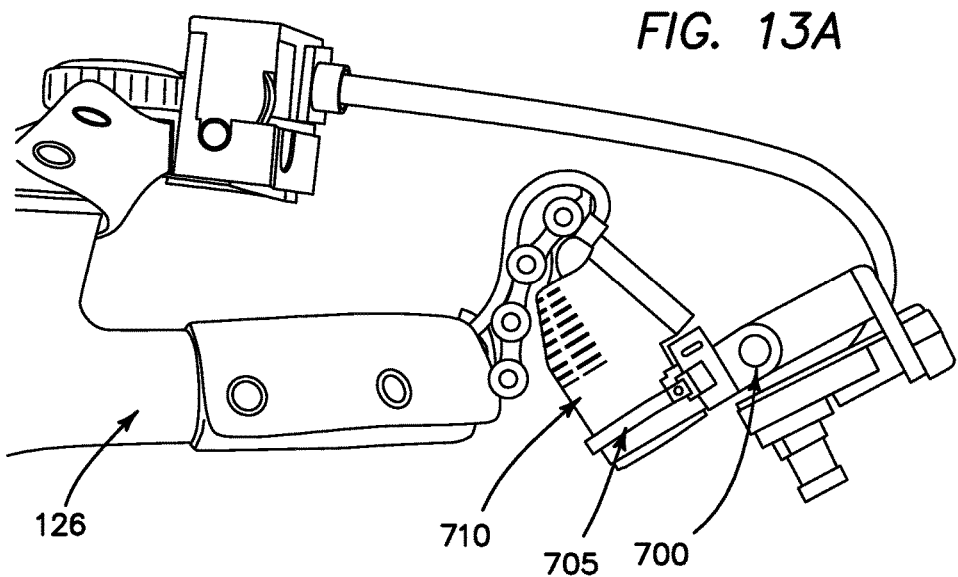
FIG. 13 illustrates a HD wearable display 435 attached to the customized video head gear with articulating band to allow the wearer to "see" the live camera output of the attached action camera, according to the embodiments of the present invention.
Figure 13B:
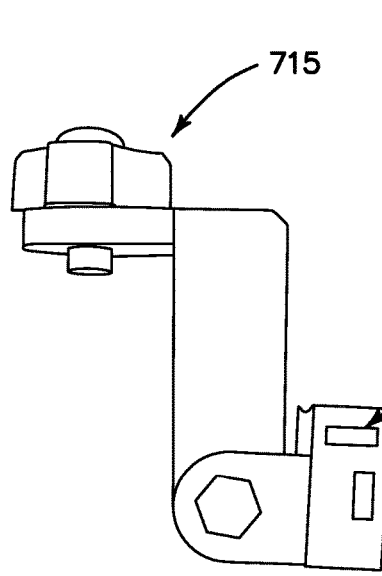
Figure 13C:
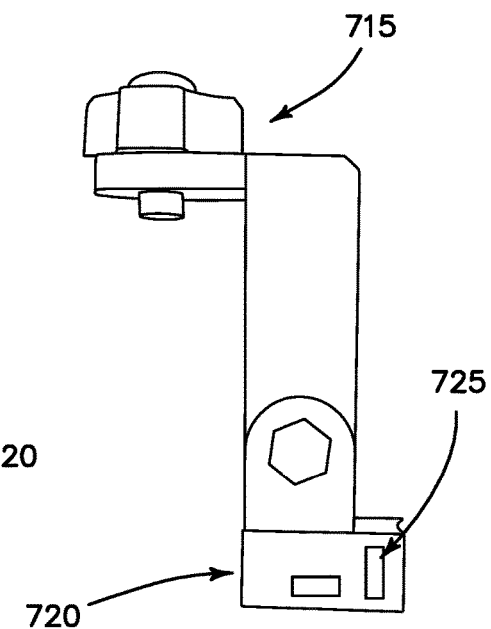
Figure 14:
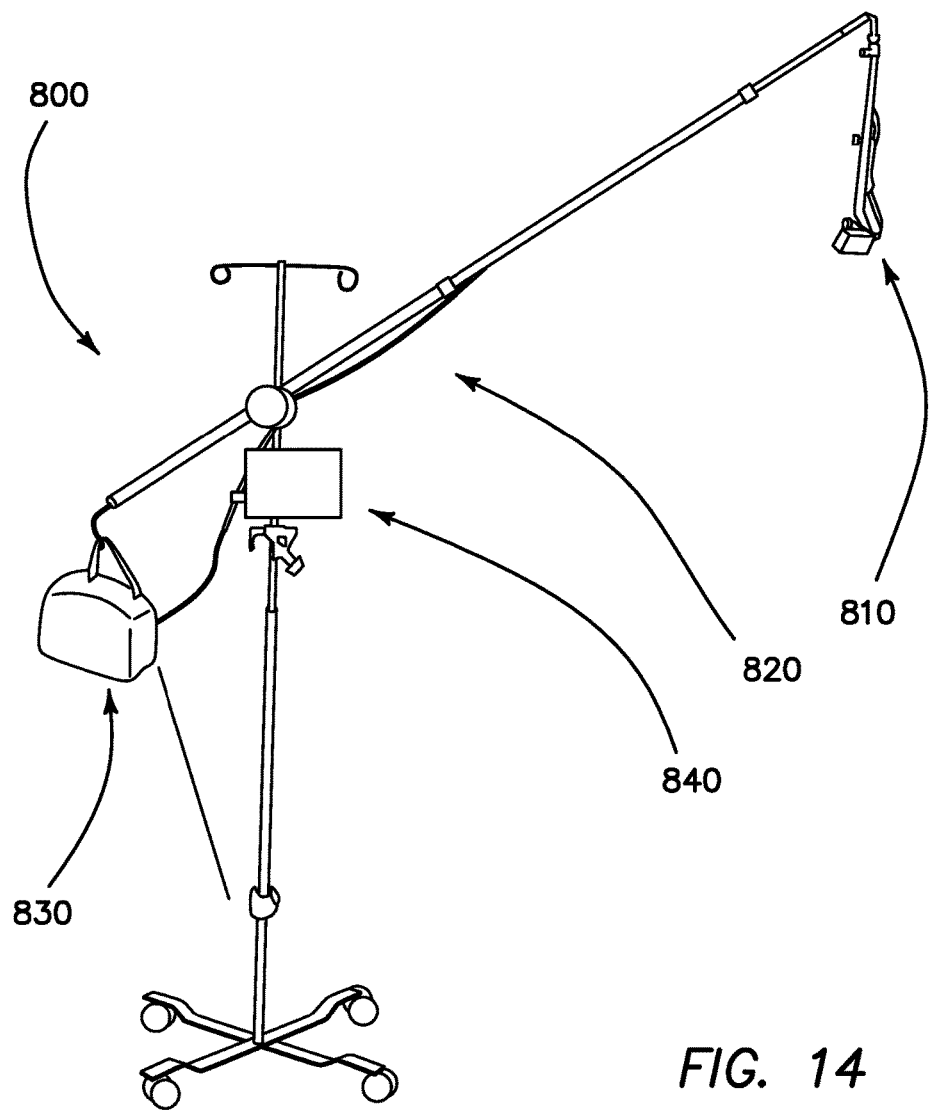
FIG. 14 illustrates a modified action camera with M12 lens magnification attachment capability, as shown the camera is attached to a customized video head gear articulating band with a ¼" threaded camera attachment according to the embodiments of the present invention.

Now referring to FIG. 13, an optional HD monitor 435 may be attached to the head-worn apparatus 420. As shown in FIG. 14, in another embodiment, a magnifying lens 440 may be integrated into the camera.

Although the invention has been described in detail with reference to several embodiments, additional variations and modifications exist within the scope and spirit of the invention as described and defined in the following claims.

I claim:

1. A system comprising: a portable video camera; a head-worn apparatus having an offset fixed mount for attachment of a camera such that a lens of said camera is in the center of the wearer's field of vision, said offset mount including multiple parallel extensions; and one or more attachment members for attaching said portable video camera to said fixed mount on said head-worn apparatus, said one or more attachment members each including a first and second series of multiple parallel extensions configured to rotatably interlace with one another and said multiple parallel extensions of said offset mount permitting said portable video camera to rotate at least upward and downward.

2. The system of claim 1 further comprising an interface for a wearer of said head-worn apparatus to stop audio recording of said camera.

3. The system of claim 1 further comprising a remote battery for powering said portable video camera.

4. The system of claim 1 further comprising a video recorder store output from said video camera.

5. The system of claim 1 further comprising a remote monitor configured to receive and display live images being captured by said portable video camera.

6. A system comprising: a portable video camera; a head-worn apparatus having a fixed mount for attachment of a camera, said fixed mount having a series of parallel mount extensions; one or more attachment members each having a first and second series of parallel attachment extensions, said first series of parallel attachment extensions configured to rotatably interlace with said parallel mount extensions; a camera mount having a series of parallel camera mount attachment extensions configured to rotatably interface with said second series of parallel attachment extensions of said attachment members; and wherein said fixed mount, said one or more attachment members and said camera mount serve to movably attach said video camera to said head-worn apparatus.

7. The system of claim 6 further comprising an interface for a wearer of said head-worn apparatus to stop audio recording of said camera.

8. The system of claim 6 further comprising a remote battery for powering said portable video camera.

9. The system of claim 6 further comprising a video recorder store output from said video camera.

10. The system of claim 6 further comprising a remote monitor configured to receive and display live images being captured by said portable video camera.

\* \* \* \* \*